(12) United States Patent
Nakagawa et al.

(10) Patent No.: US 7,556,586 B2
(45) Date of Patent: Jul. 7, 2009

(54) SHIFT CONTROL DEVICE AND SHIFT CONTROL METHOD FOR VEHICLE

(75) Inventors: Tomohiro Nakagawa, Osaka (JP); Shigeru Yamamoto, Osaka (JP); Shunji Oka, Ishikawa (JP); Toshikazu Okada, Osaka (JP)

(73) Assignee: Komatsu Ltd., Tokyo, Minato-Ku (JP)

( * ) Notice: Subject to any disclaimer, the term of this patent is extended or adjusted under 35 U.S.C. 154(b) by 409 days.

(21) Appl. No.: 11/658,297

(22) PCT Filed: Jul. 28, 2005

(86) PCT No.: PCT/JP2005/013878

§ 371 (c)(1),
(2), (4) Date: Jan. 23, 2007

(87) PCT Pub. No.: WO2006/011574

PCT Pub. Date: Feb. 2, 2006

(65) Prior Publication Data

US 2008/0312038 A1 Dec. 18, 2008

(30) Foreign Application Priority Data

Jul. 28, 2004 (JP) ............................. 2004-219964

(51) Int. Cl.
*B60W 10/04* (2006.01)
*F16H 31/00* (2006.01)

(52) U.S. Cl. ..................................... 477/108; 475/121
(58) Field of Classification Search ................. 475/120, 475/121, 122, 123
See application file for complete search history.

(56) References Cited

U.S. PATENT DOCUMENTS 5,241,477 A 8/1993 Narita (Continued)

FOREIGN PATENT DOCUMENTS

JP 03-186651 8/1991

(Continued)

OTHER PUBLICATIONS

The International Search Report published with WO2006/011574 (Feb. 2, 2006).

*Primary Examiner*—Dirk Wright
(74) *Attorney, Agent, or Firm*—Husch Blackwell Sanders LLP Welsh & Katz

(57) ABSTRACT

A shift control device and a shift control method for a vehicle for reducing shift shock by taking into account the difference in vehicle speeds before and after shifting. In one of the main inventions, the clutch pressure of another clutch (forward clutch) is controlled to match a target vehicle speed to a calculated actual vehicle speed by the time of start of the connecting operation of a selected speed stage clutch. Since such control is performed so that the vehicle speed is caused to match the target vehicle speed, an actual vehicle speed change rate is held within a predetermined range in at least the instant that the connecting operation of the selected speed stage clutch is started. Also, in another one of the main inventions, as shown in FIG. 7, control is performed to adjust the clutch pressure of the other clutch (forward clutch) so that the vehicle speed change rate reaches a predetermined value in the period from when the connecting operation of the selected speed stage clutch is started until when the connecting operation is completed.

25 Claims, 11 Drawing Sheets

U.S. PATENT DOCUMENTS

| | | | |
|---|---|---|---|
| 5,417,622 A | | 5/1995 | Asayama et al. |
| 5,478,289 A | | 12/1995 | Matsushita et al. |
| 5,573,473 A | | 11/1996 | Asayama et al. |
| 5,580,332 A | | 12/1996 | Mitchell et al. |
| 5,925,086 A | * | 7/1999 | Sakai et al. .................... 701/66 |
| 6,387,005 B1 | | 5/2002 | Matsuyama et al. |
| 7,115,065 B2 | * | 10/2006 | Tabata et al. .................... 477/3 |

FOREIGN PATENT DOCUMENTS

| | | |
|---|---|---|
| JP | 06-323419 | 11/1994 |
| JP | 06-331016 | 11/1994 |
| JP | 07-174220 | 11/1995 |
| JP | 08-320067 | 12/1996 |
| JP | 2000-097323 | 4/2000 |

* cited by examiner

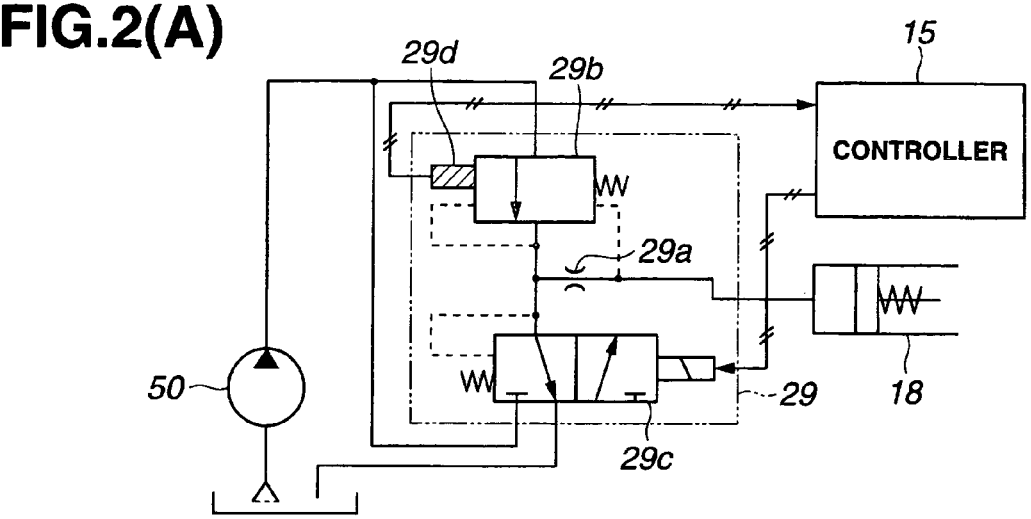
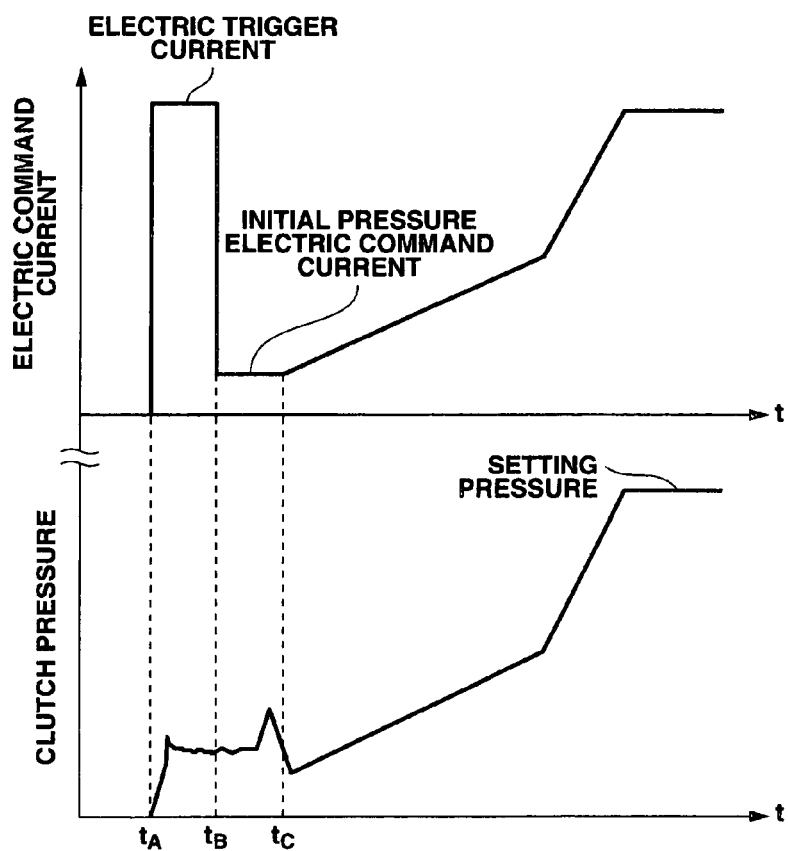

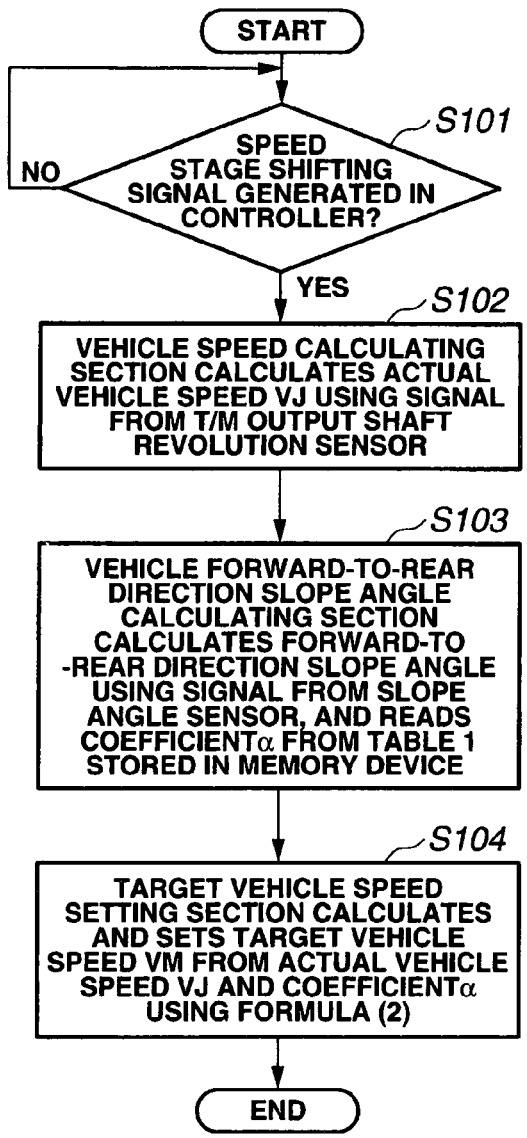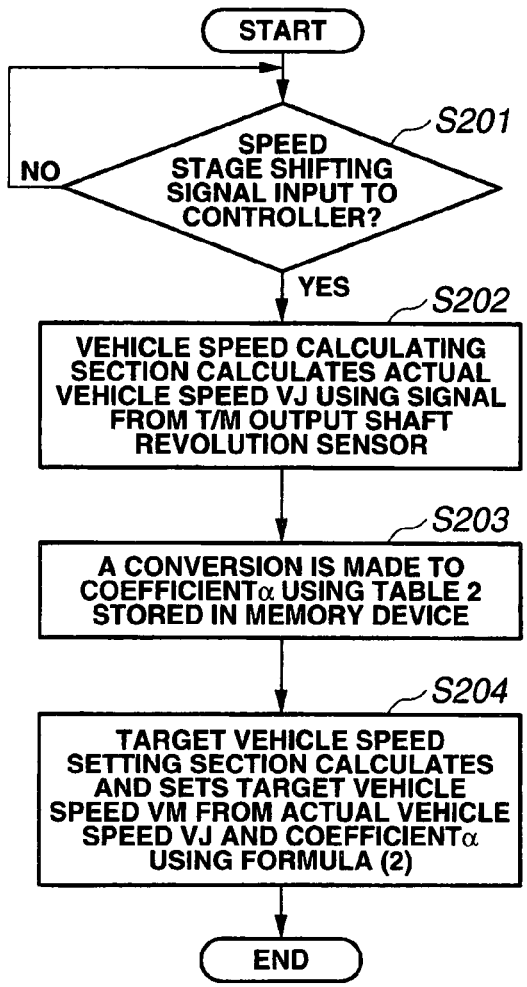
FIG.11 (A)          FIG.11 (B)

SHIFT CONTROL DEVICE AND SHIFT CONTROL METHOD FOR VEHICLE

TECHNICAL FIELD

The present invention relates to an optimum shift control device and shift control method for a vehicle installed in a work vehicle such as a bulldozer.

BACKGROUND ART

In work vehicles such as bulldozers the output of the engine is transmitted to the driving wheels (sprockets) via a drive train. A torque converter, a lockup clutch which locks up the torque converter, and a transmission are provided in the drive train of the engine. A forward clutch corresponding to a forward running stage, a reverse clutch corresponding to a reverse running stage, and speed stage clutches corresponding to each speed stage are provided in the transmission. A running operation device is provided at the operator's seat on the working vehicle. The running operation device comprises a forward/reverse operation lever and a shift switch. A forward operation command signal and a reverse operation command signal are output in accordance with the operation position of the forward/reverse operation lever. A speed stage shifting command signal is output in accordance with the operation of the shift switch.

A forward clutch is engaged (connected) when it is selected in response to the forward operation command signal. A reverse clutch is engaged (connected) when it is selected in response to the reverse operation command signal. One of the speed stage clutches is selected in accordance with the speed stage shifting command and the selected speed stage clutch is engaged. Thus the engine power is transmitted to the driving wheels via the torque converter or the lockup clutch, the selected forward clutch or reverse clutch, and the selected speed stage clutch.

This type of mechanism having speed stages cannot avoid shift shock.

Shift shock derives from torque variations generated when the input and output sides of the clutch engage (are connected) and are due to matching, by sliding friction members across each other, the difference arising in the selected clutch (transmission element) between the revolution speed on the clutch input side and the clutch output side.

Various approaches are provided in conventional technology for suppressing shift shock as shown in for example patent documents 1 and 2.

Patent document 1: Japanese Patent Application Laid-Open No. 7-174220

Patent document 2: Japanese Patent Application Laid-Open No. 2000-97323

Patent document 1 discloses a control method for a hydraulic shift device for a running vehicle such as a tractor. For example, shifting is performed as shown in FIG. 10(A) when in forward running.

More specifically, first the engagement pressure of the forward clutch, which corresponds to the forward running stage is lowered to just above zero pressure, as shown by the solid line of signal A in FIG. 10(A), when a speed stage shifting command is output in response to the operation of running operation device. Then the pre-shift speed stage clutch corresponding to the speed stage before the shift is disengaged (released), as shown by the alternate long and short dash line of signal B in FIG. 10(A), during the period when the pressure of the forward clutch is lowered to just above zero. Meanwhile the post-shift speed stage clutch, corresponding to the selected speed stage after the shift, is connected (engaged) as shown by the alternate long and two short dashes line of signal C in FIG. 10(A). In this manner the engagement pressure of the running stage clutch (forward clutch) is lowered at the time of shifting in patent document 1, hence the shift shock at the time of shifting the speed stage clutch is absorbed by the running stage clutch (forward clutch).

On the other hand the invention described in patent document 2 lowers shift shock by having a measured speed of the work vehicle at the time of shifting approach a theoretical running speed. Up-shift when in forward running is performed for example as shown in FIGS. 10(B) and 10(C).

More specifically, when a speed stage shift command (up-shift command) is output from the running operation device at time t1, as shown in FIG. 10(C), at that time t1 the forward clutch is completely disengaged (released), this disengaged state continuing until time t2. The speed stage is shifted from the pre-shift speed stage (a low-speed speed stage) to a post-shift selected speed stage (a high-speed speed stage) during the period between time t1 in which the forward clutch is completely disengaged and time t2. The forward clutch is feedback controlled at time t3 by having the measured speed of the vehicle (the solid line in FIG. 10(B)) approach the theoretical running speed (the dashed line in FIG. 10(B)) calculated from the engine revolution speed and a target shift position. For example when the measured speed of the vehicle trends towards deviating from the theoretical running speed, a fixed jerk value is provided causing the measured value of the vehicle to trend towards the theoretical running speed. Note that the jerk value is proportional to the differential value of the clutch operation pressure and is an index value for evaluating shift shock. Additionally, by performing control to maintain acceleration at a fixed value the measured speed of the vehicle is matched to the theoretical running speed. Such control of clutch pressure of the forward clutch is performed until time t5 in which the measured speed of the vehicle and the theoretical running speed match. At time t5 the forward clutch is completely connected (engaged).

DISCLOSURE OF THE INVENTION

Problem to be Solved by the Invention

As described above, according to the invention described in patent document 1, the shock that occurs at the time of shifting of a speed stage clutch can be absorbed. However, no consideration of the speed difference of the vehicle before and after shifting is described in patent document 1. Hence the invention described in patent document 1 has a problem in which there is a risk of shift shock (a feeling of being thrown) being imparted to the operator due to the difference in speed between the vehicle speed before shifting and the vehicle speed after shifting.

On the other hand, in the invention described in patent document 2, as explained in FIG. 10(B), control of the vehicle speed is performed from time t3, a time after the shifting of the speed stage clutch. Control of the vehicle speed is not performed before and immediately after the shifting of the speed stage clutch (times t1 and t2). In other words the difference in vehicle speeds before and after shifting is not considered.

Hence the invention described in patent document 2 has a problem in which there is a risk of shift shock (a feeling of being thrown) being imparted to the operator due to the difference in speed (the difference between measured speeds at time t1 and t2 in FIG. 10(B)) between the vehicle speed before shifting and the vehicle speed after shifting.

The present invention was conceived in light of this condition and offers a solution to lowering shift shock by considering the difference in vehicle speeds before and after shifting.

Means for Solving the Problem

In one of the main inventions (claims 1 and 23) of the present invention, as shown in FIG. 7, a clutch pressure P of another clutch (forward clutch 18) is controlled in order for an actual vehicle speed V to match a target vehicle speed k8·V1 by the time (from time t02 to time t04) a connecting operation of a selected speed stage clutch (third speed clutch 27) is started.

The actual vehicle speed change rate "a" is held within a predetermined range a1 to a2 in at least the instant (time t04) the connecting operation of the selected speed stage clutch (third speed clutch 27) is started by control being performed to match the vehicle speed to a target speed.

Thus, the actual vehicle speed V reaches the target vehicle speed k8·V1 at the instant (time t04) the connecting operation of the speed stage clutch (third speed clutch 27) is started (refer to (C) of FIG. 7), and the actual vehicle speed change rate "a" is reliably held within the range (a1 to a2) of a vehicle speed change rate that does not cause shift shock before the start of the connecting operation (time t04) of the speed stage clutch (third speed clutch 27).

In the present invention control is performed to match the vehicle speed V to the target vehicle speed k8·V1 during the period before the connecting operation of the post-shift selected speed stage clutch (third speed clutch 27) is started (time t04), and the actual vehicle speed change rate "a" is held to the predetermined range a1 to a2 at least before the start (time t04) of the connecting operation of the speed stage clutch (third speed clutch 27), hence the vehicle speed does not drastically change at the instant the speed stage clutch (third speed clutch 27) is connected, thus shift shock (a feeling of being thrown) is not imparted to the operator.

Also in a main invention (claims 17 and 18) which is dependent on the above invention (claim 1), as shown in FIG. 7, before time t04 in which the connecting operation of the selected speed stage clutch (third speed clutch 27) is started, the engine revolution speed is reduced to a revolution speed N2, and the input side revolution speed and the output side revolution speed of the selected speed stage clutch (third speed clutch 27) are matched (synchronized). Thus shift shock is further reduced.

In one of the main inventions of the present invention (claims 2 and 24), as shown in FIG. 7, during the period (times t04 to t05 in (G) of FIG. 7) from the start of the connecting operation of the selected speed stage clutch (third speed clutch) 27 to the completion of the connecting operation, control is performed to adjust the clutch pressure of another clutch (the currently selected forward clutch 18) in order for the vehicle speed change rate "a" to reach a predetermined value a3 (refer to (D) and (E) of FIG. 7).

More specifically, during the period from time t04 in which the connecting operation of the speed stage clutch (third speed clutch 27) is started to time t05 in which the connecting operation is completed, the clutch pressure of the other clutch (forward clutch 18) is adjusted so the actual vehicle speed change "a" reaches the predetermined value a3. Here the predetermined vehicle speed change rate a3 does not cause the operator to feel shift shock but is set to a value of a vehicle speed change rate that allows a vehicle speed suitable for the selected speed stage (third-speed speed stage 24) to be reached smoothly (without drastic changes in vehicle speed).

As described above, during the period from time t04 in which the connecting operation of the selected speed stage clutch (third speed clutch 27) is started to time t05 in which the start operation is completed, the actual vehicle speed change rate "a" is caused to be the predetermined vehicle speed change rate a3, hence the vehicle speed change during the shifting operation of the selected speed stage clutch (third speed clutch 27) is not drastic and shift shock is not imparted to the operator.

In a main invention (claim 22) that is dependent on the above invention (claim 2), as shown in FIG. 7, the clutch pressure P of a lockup clutch 34 is set to a slip state (half lockup pressure P4) during the shifting operation of the selected speed stage clutch (third speed clutch 27). Thus the shift shock of the selected speed stage clutch (third speed clutch 27) is absorbed by the lockup clutch 34 and shift shock is further reduced.

One main invention of the present invention (claims 3 and 25) is a combination of the above inventions relating respectively to claims 1 and 2, or a combination of inventions relating respectively to claims 22 and 23.

BEST MODE FOR CARRYING OUT THE INVENTION

Below an embodiment of a shift control device and shift control method for a vehicle relating to the present invention will be described in reference to the diagrams. This embodiment assumes a case in which the present invention is applied to a bulldozer as the vehicle.

FIG. 1 is a configuration drawing of a shift control device 1 of the bulldozer in the embodiment.

A brief explanation of the structure of the vehicle shift control device 1 of FIG. 1 will be given.

In work vehicles such as a bulldozer the output of an engine 2 is transmitted to sprockets 10A and 10B, which are driving wheels, via a drive train. A torque converter 3, a lockup clutch 34, which locks up the torque converter 3, and a transmission 4 are provided in the drive train of the engine 2. A forward clutch 18 corresponding to a forward running stage 19, a reverse clutch 20 corresponding to a reverse running stage 21, speed stage clutches 25, 26 and 27 (first speed clutch 25, second speed clutch 26 and third speed clutch 27) corresponding to each speed stage 22, 23 and 24 (first-speed speed stage 22, second-speed speed stage 23 and third-speed speed stage 24) are provided in the transmission 4. A running operation device 36 is provided at the operator's seat on the bulldozer. The running operation device 36 comprises a forward/reverse operation lever 36a, an up-shift switch 36b and an up-shift switch 36c. A forward operation command signal and a reverse operation command signal are generated by a controller 15 in accordance with the operation position of the forward/reverse operation lever 36a. A speed stage shifting command signal is generated by the controller 15 in accordance with the operation of the up-shift switch 36b and down-shift switch 36c. A speed stage shifting command signal is generated by the controller 15 in accordance with the load of the vehicle body at the time of automatic shifting.

The controller 15 outputs the forward operation command signal and the reverse operation command signal to the transmission 4 and outputs the speed stage shifting command signal.

When the forward operation command signal is output the forward clutch 18 is selected and the forward clutch 18 is engaged (connected). When the reverse operation command signal is output the reverse clutch 20 is selected and the reverse clutch 20 is engaged (connected). When the speed stage shifting command signal is output one of the speed stage clutches 25, 26 and 27 is selected and the selected speed stage clutch is engaged. Thus the power of the engine 2 is transmitted to the sprockets 10A and 10B via the torque converter 3 or the lockup clutch 34, the selected forward clutch 18 or the reverse clutch 20, and the selected speed stage clutch.

Each clutch of the present embodiment, 18, 20, 25, 26, 27, and 34 is a hydraulic clutch, and the friction engagement between the input side and output side of each clutch is controlled by controlling the oil pressure supplied to or released from each hydraulic clutch.

Next the structure of the vehicle shift control device 1 of FIG. 1 will be described in detail.

The revolution drive power of the engine 2 is transmitted to the torque converter 3 or the lockup clutch 34, from the output axis of this torque converter 3 or lockup clutch 34 it is transmitted to an input shaft 4a of the transmission 4, then it is transmitted to a running stage section 4b and a speed stage section 4c of the transmission 4, to an output shaft 4d of the transmission 4, and then from the output shaft 4d of the transmission 4 it is transmitted to a horizontal shaft 6 via a bevel gear 5.

Left and right planetary gear mechanisms 7A and 7B are linked respectively to the horizontal shaft 6.

An output shaft fixed to a planetary gear of the left planetary gear mechanism 7A is linked to the left side sprocket (left side driving wheel) 10A via a brake device 8 and a final drive device 9. An output shaft fixed to a planetary gear of the right planetary gear mechanism 7B is linked to the right side sprocket (right side driving wheel) 10B via the brake device 8 and the final drive device 9. Also the left and right sprockets 10A and 10B are respectively meshed to a crawler 11A and a crawler 11B placed on both the left and right sides of the vehicle body.

The revolution drive power transmitted from the horizontal shaft 6 to each ring gear of the left and right planetary gear mechanisms 7A and 7B is transmitted from each planetary gear of the left and right planetary gear mechanisms 7A and 7B to each sprocket 10A and 10B via each final drive device 9, and each crawler 11A and 11B are driven respectively by sprockets 10A and 10B.

A gear fixed integrally to a sun gear of the left planetary gear mechanism 7A and a gear fixed integrally to a sun gear of the right planetary gear mechanism 7B are meshed to a gear fixed on an output shaft of a hydraulic motor 13 via a drive train 12 formed from each required gear train. The revolution drive power of the hydraulic motor 13 is transmitted from each sun gear of the left and right planetary gear mechanisms 7A and 7B to the left and right sprockets 10A and 10B via each planetary gear and each final drive device 9. The vehicle pivots left and right by causing the revolution speeds of the left and right sprockets 10A and 10B to differ. This mechanism is referred to as a hydrostatic steering system (HSS).

The engine 2 is a diesel type engine. An accumulator (common rail) type fuel injection device 14 is installed in the engine 2. The actual fuel injection device 14 is a well-known device. More specifically, in the accumulator (common rail) type fuel injection device 14 fuel is accumulated in the common rail chamber from a fuel pressure providing pump, fuel is injected from an injector by the opening and closing of an electromagnetic valve, fuel injection characteristics are determined by a drive signal from the controller 15 to the electromagnetic valve, and desired injection characteristics are obtained from the low-speed zone to the high-speed zone of the engine 2.

An electrically controlled injection system is configured in the present embodiment comprising the fuel injection device 14, the controller 15 and various types of sensors. In such an electrically controlled injection system target injection characteristics are mapped as digital values whereby an engine output torque can be obtained at a desired strength.

The actual revolution speed of the engine 2 is detected by an engine revolution speed sensor 16, and an engine revolution speed signal detected by the engine revolution speed sensor 16 is input to the controller 15. Also in a throttle lever 17 a throttle amount is set to indicate a target revolution speed of the engine 2 according to the operation of the throttle lever 17. A potentiometer 17a is installed in the throttle lever 17, and a throttle signal is detected at the potentiometer 17a. The detected throttle signal is input to the controller 15.

The running stage section 4b of the transmission 4 is structured by comprising the forward running stage 19, selected by the connecting of the forward clutch 18, and the reverse running stage 21, selected by the connecting of the reverse clutch 20. The forward clutch 18 and the reverse clutch 20 are each structured as hydraulic operation type friction clutches (hydraulic clutches). The forward running stage 19 and the reverse running stage 21 are each formed by a planetary gear train (or a parallel shaft gear train).

The speed stage section 4c of the transmission 4 is structured by comprising the first-speed speed stage 22, second-speed speed stage 23 and third-speed speed stage 24, selected respectively by the connection of the first speed clutch 25, second speed clutch 26 or third speed clutch 27.

The first speed clutch 25, which corresponds to the first-speed speed stage 22, the second speed clutch 26, which corresponds to the second-speed speed stage 23 and the third speed clutch 27, which corresponds to the third-speed speed stage 24 are each structured by hydraulic operation type friction clutches (hydraulic clutches). Also the first-speed speed stage 22, second-speed speed stage 23 and third-speed speed stage 24 are each formed by a respective planetary gear train (or a parallel shaft gear train).

The actual revolution speed of the output shaft 4d of the transmission 4 is detected by a T/M output shaft revolution speed sensor 28, and the T/M output shaft revolution speed detected by this T/M output shaft revolution speed sensor 28 is input to the controller 15. In the controller 15, the input actual revolution speed of the output shaft 4d of the transmission 4 is converted to a vehicle speed V.

An ECMV (Electric Control Modulation Valve) 29, which controls the connecting operation and the disengaging operation of the forward clutch 18, is installed in the transmission 4. The forward clutch 18 connecting operation is carried out when the forward operation command signal is output from the controller 15 to the ECMV 29.

The ECMV 29 is a servo valve, which controls hydraulic oil, supplied to and released from the forward clutch 18, and is structured as shown in FIG. 2(A).

The ECMV 29 is structured by combining a circulation amount detection valve 29b, which opens and circulates a large amount of hydraulic oil to the forward clutch 18 when there is a circulation of hydraulic oil in an orifice 29a, and an electromagnetic proportion pressure control valve 29c, which adjusts the hydraulic oil circulating in the forward clutch 18 in accordance with an electric command current output from the controller 15.

When the electric command current input from the controller 15 to the ECMV 29 changes as shown in FIG. 2(B), the pressure of the forward clutch 18 (clutch oil pressure) varies as shown in FIG. 2(C). Thus the oil pressure of the forward clutch 18 varies in accordance with the electric command current applied from the controller 15 to the ECMV 29 causing the degree of engagement of the forward clutch 18 to vary.

More specifically, when an electric trigger current is input from the controller 15 to the electromagnetic proportion pressure control valve 29c, the electromagnetic proportion pressure control valve 29c opens, hydraulic oil discharged from the hydraulic pump 50 passes through the electromagnetic proportion pressure control valve 29c and the orifice 29a and the forward clutch 18 starts to be filled (at time tA in FIGS. 2(B) and 2(C)).

When operation oil circulates into the orifice 29a a pressure difference arises between the front and the back of the orifice 29a. The upstream side pressure and the downstream side pressure of the orifice 29a operate on both ends of the spool of the circulation amount detection valve 29b. When a difference in pressure arises between the front and the back of the orifice 29a, more specifically, when the upstream side pressure is greater than the downstream side pressure, the circulation amount detection valve 29b opens due to the difference in the areas having pressure applied in the spool of the circulation amount detection valve 29b. Thus the hydraulic oil discharged from the hydraulic pump 50 passes through the circulation amount detection valve 29b and the orifice 29a and the forward clutch 18 starts to be filled (from time tA to tB in FIGS. 2(B) and 2(C)).

During the period in which the hydraulic oil circulates to the forward clutch 18, more specifically, during the period in which a difference in pressure arises between the front and the back of the orifice 29a, the circulation amount detection valve 29b remains open even if the electronic command current value input to the electromagnetic proportion pressure control valve 29c is lowered to the initial pressure level. Thus the hydraulic oil discharged from the hydraulic pump 50 quickly fills the forward clutch 18 (from time tB to tC in FIGS. 2(B) and 2(C)).

When the forward clutch 18 is filled with the hydraulic oil (completion of filling time), the circulation of hydraulic oil to the forward clutch 18 stops, hence the difference in pressure between the front and the back of the orifice 29a dissipates. This causes the circulation amount detection valve 29b to close. When the circulation amount detection valve 29b closes, the spool of the circulation amount detection valve 29b contacts a fill switch 29d and a fill signal, which indicates completion of the filling, is input from the fill switch 29d to the controller 15 (at time tC in FIGS. 2(B) and 2(C)).

The controller 15 gradually increases the clutch oil pressure supplied to the forward clutch 18 from when the fill signal is input, thus it causes the electric command current value input to the electromagnetic proportion pressure control valve 29c to gradually increase. Thus the clutch oil pressure that operates in the forward clutch 18 gradually increases (builds up) (from time tC in FIGS. 2(B) and 2(C)). When the clutch oil pressure of the forward clutch 18 reaches a setting pressure, the connecting operation of the input side and output side of the forward clutch 18 is completed. Also, when the electric current of the disengage command is input from the controller 15 to the ECMV 29, oil pressure from the forward clutch 18 is released. Thus the input side and the output side of the forward clutch 18 are disengaged.

In the same manner the corresponding ECMV 30, ECMV 31, ECMV 32 and ECMV 33 are installed respectively in the reverse clutch 20, first speed clutch 25, second speed clutch 26 and third speed clutch 27 of the transmission 4. Each ECMV operates in the same manner shown in FIG. 2 as the ECMV 29 does in the forward clutch 18, and each clutch 20 and 25 to 27 operates in the same manner as the forward clutch 18.

The lockup clutch 34 is comprised in the torque converter 3. The lockup clutch 34 fixedly links a pump 3a (input element) of the torque converter 3 and a turbine 3b (output element) when it is deemed that the characteristics of a torque converter are not necessary.

When the electric command current is input from the controller 15 to the ECMV 35, the ECMV 35 changes the oil pressure operating on the lockup clutch 34 in accordance with the electric command current, and controls the connecting and disengaging operations of the lockup clutch 34.

When the lockup clutch 34 is disengaged by the ECMV 35, the mechanical power of the engine 2 is converted to dynamic fluid energy in the torque converter 3 for an instant and then converted once more to mechanical energy and then input to the transmission 4. Thus any vibrations or shocks that arise in the drive train below the engine 2 and the transmission 4 are reduced by the damping effect of the torque converter 3. Also, when the lockup clutch 34 is placed in a sliding state by the ECMV 35, the shocks and the like arising in the drive train below the transmission 4 are absorbed by the lockup clutch 34. Also, when the lockup clutch 34 is placed in a sliding state by the ECMV 35, the mechanical energy from the engine 2 is directly input into the transmission 4 and the power of the engine 2 is transmitted efficiently to the drive train downstream from the engine 2. Note that when the lockup clutch 34 is in a connected state, circulation of the operation fluid in the torque converter 3 dissipates and fluid shear resistance arises in between the lockup clutch 34 and a stator 3c (reaction element) of the torque converter 3, hence when the lockup clutch 34 is in a connected state, a stator clutch not shown in the drawings is released and the stator 3c is disengaged.

The running operation device 36 is provided in the operator's cab. The running operation device 36 comprises the forward/reverse operation lever 36a provided for selecting the forward running stage 19 or the reverse running stage 21, and the up-shift switch 36b and the up-shift switch 36c, which are installed in the forward/reverse operation lever 36a and provided to switchingly select the first-speed to third-speed speed stages 22 to 24.

The forward/reverse operation lever 36a is operation means for selecting each operation position, forward direction running position F, neutral position N, and reverse direction running position R. The forward/reverse operation lever 36a is used to switch from the forward direction running position F and the reverse direction running position R, passing through the neutral position N.

An operation position sensor 36d, which detects operation positions F, R and N, is installed in the forward/reverse operation lever 36a. The operation position sensor 36d is structured from for example a potential meter, a limit switch or the like.

When the 35a operates the operation position is detected by the operation position sensor 36d and the information is input to the controller 15. In the controller 15 a forward operation command signal is generated corresponding to the operation position F. Also, in the controller 15 a reverse operation command signal is generated corresponding to the operation position R.

A sensor 36e, which detects the operation of the switch, is installed in the up-shift switch 36b and the down-shift switch 36c.

When the up-shift switch 36b is operated, a signal indicating an operation is input from the sensor 36e to the controller 15. In the controller 15 a speed stage shifting command signal, in other words an up-shift command signal indicating an up-shift is generated on the basis of the operation signal.

Also, when the down-shift switch 36c operates, a signal indicating an operation is input from the sensor 36e to the controller 15. In the controller 15 a speed stage shifting command signal, in other words a down-shift command signal indicating a down-shift is generated on the basis of the operation signal.

Also the up-shift switch 36b, even when the down-shift switch 36c is not operating, conforms to the predetermined shift map in the controller 15, a speed stage shifting command signal is generated in accordance with the load and the like of the vehicle body, and automatic shifting in the transmission 3 is performed.

A slope angle sensor 37, which detects a forward-to-rear direction slope angleθ of the vehicle is provided in the vehicle. A signal indicating the forward-to-rear direction slope angleθ detected in the slope angle sensor 37 is input to the controller 15.

The controller 15 is structured from an input interface, which converts and shapes input signals from each sensor, switch and the like, a microcomputer, which performs mathematical calculations or logic calculations on input data by following a predetermined procedure, and an output interface, which converts the calculation results to actuator drive signals, then electrically amplifies those actuator drive signals and outputs them as electric command currents.

The controller 15 comprises as its main functions the below (1) to (12), as shown in the function block drawing of FIG. 3.

(1) A vehicle speed calculating section 15a;

In the vehicle speed calculating section 15a the actual speed of the vehicle body (actual vehicle speed) V is calculated on the basis of a T/M output shaft revolution speed signal input from the T/M output shaft revolution speed sensor 28.

(2) A vehicle speed change rate calculating section 15b;

In the vehicle speed change rate calculating section 15b the amount of variation of the actual speed of the vehicle body per unit of time, in other words an actual vehicle speed change rate "a", is calculated on the basis of the actual vehicle speed V calculated in the vehicle speed calculating section 15a.

(3) A slip rate calculating section 15c;

In the slip rate calculating section 15c, a slip rate S of the drive chain from the engine 2 to the output shaft 4d of the transmission 4 is calculated.

(4) A vehicle forward-to-rear direction slope angle calculating section 15d;

In the vehicle forward-to-rear direction slope angle calculating section 15d, the current vehicle forward-to-rear direction slope angleθ is calculated on the basis the signal of the vehicle forward-to-rear direction slope angleθ input from the slope angle sensor 37. Also, whether the vehicle is descending a slope or ascending a slop is detected according to the polarity of the signal of the vehicle forward-to-rear direction slope angleθ. When the front portion of the vehicle body is on the lower side and the rear portion of the vehicle body is on the upper side (when descending a slope), the polarity of the vehicle forward-to-rear direction slope angle signal is negative, and when the front portion of the vehicle body is on the upper side and the rear portion of the vehicle body is on the lower side (when ascending a slope), the polarity of the vehicle forward-to-rear direction slope angle signal is positive.

(5) A target vehicle speed setting section 15e;

In the target vehicle speed setting section 15e, when the connecting operation of the speed stage clutch corresponding to the selected speed stage (the post-shift speed stage) is started (when the speed stage clutch corresponding to the speed stage before the shifting is disengaged), a target speed VM is set as the target value that the actual vehicle speed V should reach.

(6) An ECMV control section 15f;

The ECMV control section 15f generates the electric command current for output to the ECMV 29 that corresponds to the forward clutch 18, outputs the electric command current to the ECMV 29 and thus controls the ECMV 29.

(7) An ECMV control section 15g;

The ECMV control section 15g generates the electric command current for output to the ECMV 30 that corresponds to the reverse clutch 20, outputs the electric command current to the ECMV 30 and thus controls the ECMV 30.

(8) An ECMV control section 15h;

The ECMV control section 15h generates the electric command current for output to the ECMV 31 that corresponds to the first speed clutch 25, outputs the electric command current to the ECMV 31 and thus controls the ECMV 31.

(9) An ECMV control section 15i;

The ECMV control section 15i generates the electric command current for output to the ECMV 32 that corresponds to the second speed clutch 26, outputs the electric command current to the ECMV 32 and thus controls the ECMV 32.

(10) An ECMV control section 15j;

The ECMV control section 15j generates the electric command current for output to the ECMV 33 that corresponds to the third speed clutch 27, outputs the electric command current to the ECMV 33 and thus controls the ECMV 33.

(11) An ECMV control section 15k;

The ECMV control section 15k generates the electric command current for output to the ECMV 35 that corresponds to the lockup clutch 34, outputs the electric command current to the ECMV 35 and thus controls the ECMV 35.

(12) A fuel injection device control section 15m;

The fuel injection device control section 15m generates the electric command current for output to an electromagnetic valve of the fuel injection device 14, outputs the electric command current to the electromagnetic valve of the fuel injection device 14, and thus controls the fuel injection device 14.

In the slip rate calculating section 15c, the below formula (1) is used to calculate the drive train slip rate S from the engine 2 to the output shaft 4d, in which NE is the actual revolution speed of the engine 2, "i" is the deceleration ratio (change in speed ratio) of the transmission 4, and NT/M-OUT is the actual revolution speed of the output shaft 4d of the transmission 4.

$$S[\%]=(NE-NT/M\text{-}OUT \times i)/NE \times 100 \qquad (1)$$

In the target vehicle speed setting section 15e, when the speed stage shifting command signal (up-shift signal and down-shift signal) is generated in the controller 15, the target vehicle speed VM is calculated using the below formula (2), in which VJ is the actual vehicle speed calculated in the vehicle speed calculating section 15a, and the vehicle forward-to-rear direction slope angleθ is the vehicle forward-to-rear direction slope angle calculated in the 15d. However, the coefficient α in the below formula (2) is obtained on the basis of table 1 below.

$$VM=\alpha VJ \qquad (2)$$

1 α: coefficient (refer to table 1)

TABLE 1

|  |  | Flat surface slope angle | Vehicle forward-to-rear direction slope angle when descending a slope | | Vehicle forward-to-rear direction slope angle when ascending a slope | |
| --- | --- | --- | --- | --- | --- | --- |
|  |  | $-6° < \theta < 6°$ | $-12° < \theta \leq -6°$ | $\theta \leq -12°$ | $6° \leq \theta < 12°$ | $12° \leq \theta$ |
| Up-shift | 1st speed to 2nd speed | k1 | k7 | k13 | k19 | k25 |
|  | 1st speed to 3rd speed | k2 | k8 | k14 | k20 | k26 |
|  | 2nd speed to 3rd speed | k3 | k9 | k15 | k21 | k27 |
| Down-shift | 3rd speed to 2nd speed | k4 | k10 | k16 | k22 | k28 |
|  | 3rd speed to 1st speed | k5 | k11 | k17 | k23 | k29 |
|  | 2nd speed to 1st speed | k6 | k12 | k18 | k24 | k30 |

(note)
k1 to k30 are constants

As shown in table 1 above the coefficient α is set to $k_1$ to $k_{30}$ in accordance with the vehicle forward-to-rear direction slope angle θ and the contents of the speed stage shifting signal. $k_1$ to $k_{30}$ are predetermined constants.

The target vehicle speed VM holds the vehicle speed change rate "a" within the predetermined range a1 to a2 before the start of the connecting operation of the selected speed stage clutch, and is set to a value in which shift shock does not occur in the instant the connecting operation of the selected speed stage clutch is started.

The contents of table 1 are stored in the form of a data table in the memory of the controller 15.

As shown in table 1 the coefficientα is set in accordance with the vehicle forward-to-rear direction slope angleθ. The vehicle forward-to-rear direction slope angleθ has a negative polarity when the front portion of the vehicle body is on the lower side and the rear portion of the vehicle body is on the upper side (when descending a slope), and has a positive polarity when the front portion of the vehicle body is on the upper side and the rear portion of the vehicle body is on the lower side (when ascending a slope).

Table 1 classifies the vehicle forward-to-rear direction slope angleθ into five categories. More specifically the vehicle forward-to-rear direction slope angleθ categories are classified as: the vehicle is on a flat surface (slope angleθ is greater than minus 6 degrees and less than plus 6 degrees); the vehicle is descending a slope and the vehicle forward-to-rear direction slope angleθ is greater than minus 12 degrees and less than or equal to minus 6 degrees; the vehicle is descending a slope and the vehicle forward-to-rear direction slope angleθ is less than or equal to minus 12 degrees; the vehicle is ascending a slope and the vehicle forward-to-rear direction slope angleθ is greater than or equal to plus 6 degrees and less than plus 12 degrees; and the vehicle is ascending a slope and the vehicle forward-to-rear direction slope angleθ is greater than or equal to plus 12 degrees.

The coefficientα is set so that the target vehicle speed VM gets smaller when the vehicle is ascending a slope and the target vehicle speed VM gets greater when the vehicle is descending a slope. The reason being that the vehicle speed increases because of acceleration components, which are added to the vehicle due to gravity more so when the vehicle is descending a slope than when it is ascending a slope.

Also, as shown in table 1, the coefficientα is set in accordance with the contents of the speed stage shifting signal, which are, more specifically, "the up-shift from first speed to second speed", "the up-shift from first speed to third speed", "the up-shift from second speed to third speed", "the down-shift from third speed to second speed", "the down-shift from third speed to first speed", and "the down-shift from second speed to first speed". The deceleration ratio "i" of the transmission 4 varies in accordance with the contents of this speed stage shifting signal and it is necessary to set the target vehicle speed VM to match these variations.

Figures will be given to show the relationship between the coefficientα shown in table 1 and the target vehicle speed VM.

With the vehicle body speed VJ at the time of shifting assumed to be 100%, when an up-shift is performed with the vehicle forward-to-rear direction slope angle θ less than or equal to minus 6 degrees and greater than 12 degrees ($-12°<\theta\leq-6°$)(up-shift on a descending slope), the target vehicle speed VM is set to a value of 120% by the coefficientα.

Also in the same manner, with the vehicle body speed VJ at the time of shifting assumed to be 100%, when an up-shift is performed with the vehicle forward-to-rear direction slope angleθ less than or equal to minus 12 degrees ($\theta\leq-12°$)(up-shift on a descending slope), the target vehicle speed VM is set to a value of 130% by the coefficientα.

With the vehicle body speed VJ at the time of shifting assumed to be 100%, when a down-shift is performed with the vehicle forward-to-rear direction slope angleθ less than plus 6 degrees and greater than minus 6 degrees ($-6°<\theta<6°$) (down-shift on a flat surface), the target vehicle speed VM is set to a value of 95% by the coefficientα.

With the vehicle body speed VJ at the time of shifting assumed to be 100%, when a down-shift is performed with the vehicle forward-to-rear direction slope angleθ greater than or equal to plus 6 degrees and less than plus 12 degrees ($6°\leq\theta<12°$)(down-shift on an ascending slope), the target vehicle speed VM is set to a value of 70% by the coefficientα.

The settings of the coefficientα shown in table 1 are one example.

In table 1 the coefficients is set in accordance with the vehicle forward-to-rear direction slope angleθ and the contents of the speed stage shifting signal, however, as shown in table 2 below, it is also possible to implement an embodiment in which the vehicle forward-to-rear direction slope angleθ is omitted and the coefficient α is set in accordance with the contents of the speed stage shifting signal.

TABLE 2

|  |  | Value of coefficient α |
|---|---|---|
| Up-shift | 1st speed to 2nd speed | k1 |
|  | 1st speed to 3rd speed | k2 |
|  | 2nd speed to 3rd speed | k3 |
| Down-shift | 3rd speed to 2nd speed | k4 |
|  | 3rd speed to 1st speed | k5 |
|  | 2nd speed to 1st speed | k6 |

As shown in table 2 above, the coefficient α is set to from $k_1$ to $k_6$ in accordance with the contents of the speed stage shifting signal. $k_1$ to $k_6$ are predetermined constants.

Also, it is possible to implement an embodiment in which the coefficient α is set to a value that varies in size according to whether the contents of the speed stage shifting signal indicate an up-shift or a down-shift.

In table 1 the coefficient α is set in accordance with the vehicle forward-to-rear direction slope angle θ and the contents of the speed stage shifting signal, however, as shown in table 3 below, it is also possible to implement an embodiment in which the contents of the speed stage shifting signal are omitted, and the coefficient α($k_{100}$ to $k_{500}$) is set in accordance with the vehicle forward-to-rear direction slope angle θ.

TABLE 3

| Flat surface slope angle | Vehicle forward-to-rear direction slope angle when descending a slope | | Vehicle forward-to-rear direction slope angle when ascending a slope | |
|---|---|---|---|---|
| $-6° < \theta < 6°$ | $-12° < \theta \leq -6°$ | $\theta \leq -12°$ | $6° \leq \theta < 12°$ | $12° \leq \theta$ |
| k100 | k200 | k300 | k400 | k500 |

It is also possible to implement an embodiment in which the coefficient α is set to a value that varies in size according to whether the vehicle is descending a slope (for example the polarity of the vehicle forward-to-rear direction slope angle θ is negative) or ascending a slope.

In the present embodiment a forward clutch control device 38 is structured by the ECMV control section 15f and the ECMV 29 corresponding to the forward clutch 18. The forward clutch control device 38 performs a pressure adjustment operation on the forward clutch 18, controls the connection and disengagement of the forward clutch 18, and controls the friction engagement of the forward clutch 18.

A reverse clutch control device 39 is structured by the ECMV control section 15g and the ECMV 30 corresponding to the reverse clutch 20. The reverse clutch control device 39 performs a pressure adjustment operation on the reverse clutch 20, controls the connection and disengagement of the reverse clutch 20, and controls the friction engagement of the reverse clutch 20.

A first speed clutch control device 40 is structured by the ECMV control section 15h and the ECMV 31 corresponding to the first speed clutch 25. The first speed clutch control device 40 performs a pressure adjustment operation on the first speed clutch 25, controls the connection and disengagement of the first speed clutch 25, and controls the friction engagement of the first speed clutch 25.

A second speed clutch control device 41 is structured by the ECMV control section 15i and the ECMV 32 corresponding to the second speed clutch 26. The second speed clutch control device 41 performs a pressure adjustment operation on the second speed clutch 26, controls the connection and disengagement of the second speed clutch 26, and controls the friction engagement of the second speed clutch 26.

A third speed clutch control device 42 is structured by the ECMV control section 15j and the ECMV 33 corresponding to the third speed clutch 27. The third speed clutch control device 42 performs a pressure adjustment operation on the third speed clutch 27, controls the connection and disengagement of the third speed clutch 27, and controls the friction engagement of the third speed clutch 27.

A lockup clutch control device 43 is structured by the ECMV control section 15k and the ECMV 35 corresponding to the lockup clutch 34. The lockup clutch control device 43 performs a pressure adjustment operation on the lockup clutch 34, and controls the clutch pressure of the lockup clutch 34 so that it matches the waveform shown in for example FIG. 4.

More specifically, as shown in FIG. 4, when a speed stage shifting command signal is generated by and output by the controller 15, a two-stage operation to lower pressure is perform in accordance with the speed stage shifting command signal during the period from time td to time te. In other words, first, at time te, the clutch pressure P of the lockup clutch 34 falls from a setting pressure PS, which occurs when the lockup clutch 34 enters a completely connected state, to an intermediate pressure PJ (a base pressure plus a crossover pressure), and this pressure PJ is maintained during a predetermined time period (td to te). At time te, which occurs after a predetermined period of time has passed from time td, the pressure falls in the lockup clutch 34 until the lockup clutch 34 reaches a half lockup pressure PH (base pressure plus the initial half lockup pressure) in which the lockup clutch 34 enters a sliding state. A "sliding state" is one in which the power of the engine 2 is transmitted via a clutch, however, it is a state in which a complete connection state is not yet reached and the input side and output side of the clutch slide against each other due to mechanical friction. This half lockup pressure PH is a pressure value calculated by adding a predetermined pressure (initial half lockup pressure) to a base pressure in which the lockup clutch 34 enters a completely disengaged state.

The reason such a two-stage operation to lower the pressure of the lockup clutch 34 is used is, if a one-stage operation is assumed to lower the clutch pressure P of the lockup clutch 34 from the setting pressure PS to the half lockup pressure PH during the period from time td to time te, it will become necessary to prevent the risk of such problems as overshoot occurring, the oil pressure operating in the lockup clutch 34 dropping as far as the base pressure, and the lockup clutch 34 completely disengaging.

Also, the reason the clutch pressure P of the lockup clutch 34 is lowered to the half lockup pressure PH is that the sliding state of the lockup clutch 34 lessens shift shock at the time of connecting a speed stage clutch.

In the same manner as above, when the clutch pressure P of the lockup clutch 34 falls to the half lockup pressure PH at time te, that pressure PH is maintained for a predetermined time period (te to th). When the half lockup pressure PH is maintained for the predetermined time period, the clutch pressure P is raised to a connection standby pressure Pi (base pressure plus initial pressure) at time th, and this connection standby pressure Pi is maintained for a predetermined time period (th to tf). When the connection standby pressure Pi is maintained for the predetermined time period, the clutch pressure P of the lockup clutch 34 is gradually increased from time tf. The pressure rise slope of the clutch pressure P is set in accordance with the slip rate S calculated in the slip rate calculating section 15c.

A pressure rise slope φ corresponding to the slip rate S, is stored in advance as a data table in the memory of the controller 15. The pressure rise slope φ is stored corresponding to the slip rate in a relationship in which as the slip rate gets bigger, the value of the pressure rise slope φ gets smaller.

The reason that the pressure rise slope φ of the clutch pressure P is set in accordance with the slip rate during the time in which the clutch pressure P of the lockup clutch 34 is gradually increased is that the vehicle speed change rate "a" is maintained at a predetermined value by adjusting the torque transmission rate in accordance with the slip rate at the time of shifting so that the shock that occurs when a speed stage clutch is engaged and the shock that occurs when the lockup clutch 34 is engaged are reduced.

In FIG. 4 the case in which the clutch pressure P of the lockup clutch 34 rises in accordance with slip rates SA, SB and SC, sloping up initially at φA then sloping up at φB is shown as an example.

However, the period in which the clutch pressure P of the lockup clutch 34 is gradually increased in accordance with the slip rate is set to a predetermined time limit period tf to tg. This is due to that when the period in which the lockup clutch 34 slides is long, the heat burden on the clutch is great. When the predetermined time limit period has passed the clutch pressure P rises sloping up at a larger slope φC from time tg, allowing the setting pressure to be reached quickly and the lockup clutch 34 to be completely connected.

An engine control device 44 is structured from the fuel injection device 14 and the fuel injection device control section 15m. The engine control device 44 controls the fuel injection amount of the fuel injection device 14. Adjustment of the fuel injection amount is performed by controlling for example, a governor installed in the fuel injection pump of the engine. Generally a governor of all-speed governing type is employed, and the governor adjusts the engine revolution speed and the fuel injection amount in accordance with the load in order to reach the target revolution speed in accordance with the amount that the accelerator pedal is operated. More specifically the fuel injection amount is controlled so that the difference is eliminated between the target revolution speed and the actual engine revolution speed.

FIG. 5 shows the relationship between the engine revolution speed (RPM) and the output torque of the engine 2, in other words, the maximum torque line.

In the present embodiment the maximum torque line is varied in accordance with the driving mode of the engine 2.

In a full load driving mode in which the throttle lever 17 is operated to the full position, the engine 2 is operated in the area regulated by a maximum torque line TA indicated by the solid line. The engine 2 outputs a rated horsepower at a rated point on the maximum torque line TA. In the full load driving mode the engine control device 44 controls the engine 2 so that the output of the engine 2 does not exceed the maximum torque line TA, which would otherwise cause the exhaust smoke limit to be exceeded and black smoke to be exhausted into the outside air.

On the other hand, when the throttle lever 17 is operated in the full position and is switched to a high output driving mode, the engine 2 is operated in the area regulated by a maximum torque line TB indicated by the broken line. The characteristic of the engine output torque shown by the maximum torque line TB is that power is temporarily raised so that the horsepower of the engine 2 exceeds the rated horsepower. The engine control device 44 controls the fuel injection amount so that, when in the high output driving mode, as shown by the diagonal lines G in FIG. 5, a fuel amount exceeding the upper limit of the fuel injection amount regulated by the maximum torque line TA of the full load driving mode, is injected from the fuel injection device 14.

Switching from the full load driving mode to the high output driving mode and vice versa is performed by the engine control device 44.

Also the engine control device 44 adjusts the engine revolution speed from when a speed stage shifting command is input to the controller 15 and before the connecting operation of the selected speed stage clutch is started, and controls the input side revolution speed and the output side revolution speed of the selected speed stage clutch so that they are matched (synchronized).

The engine control device 44 sets as the target engine revolution speed an engine revolution speed, in which, at the time the shifting operation starts, the revolution speed of the clutch input shaft, when the connecting operation of the speed stage clutch corresponding to the post-shift speed stage is performed, is synchronized to the revolution speed of the output shaft of the speed stage clutch corresponding to the post-shift speed stage. Thus the fuel injection amount from the fuel injection device 14 is controlled so that the actual engine revolution speed is matched to the target engine revolution speed before the start of the connecting operation of the speed stage clutch corresponding to the post-shift speed stage.

The control of the engine revolution speed described above is performed to reduce shock at the time a speed stage clutch is engaged.

In a memory device 15n of the controller 15 the following data is stored.

1) Data tables corresponding to table 1, table 2, or table 3 and a date table storing the relationship between the slip rate S and the pressure rise slope φ

2) The map data of the engine output torque characteristics shown in FIG. 5

3) The program corresponding to the control logic shown in the flowcharts in FIGS. 6, 8, and 11 and the time charts in FIGS. 7 and 9

The processing performed by the controller 15, in other words the operation of the vehicle shift control device 1 of the present embodiment will be explained below.

Examples will be explained below of A) the up-shift shifting operation from the forward first speed to the forward third speed when descending a slope, and B) the down-shift shifting operation from the forward third speed to the forward first speed when ascending a slope.

A: The up-shift shifting operation from the forward first speed to the forward third speed when descending a slope:

When a case is assumed in which the up-shift switch 36b is operated at the discretion of the operator while the vehicle is running forward or in reverse, shift shock (a feeling of being thrown) is imparted to the operator when the vehicle speed drastically changes when the post-shift selected speed stage clutch is connected. In particular, when the vehicle is descending a slope, a greater shift shock is felt by the operator because an acceleration element is added due to gravity.

In the embodiment described below, when the vehicle is descending a slope, shift shock is not imparted to the operator when for example an up-shift is performed from forward first speed to forward third speed.

FIGS. 6 and 11 are flowcharts explaining the up-shift shifting operation from forward first speed to forward third speed when descending a slope. FIG. 7 is a time chart explaining the same shifting operation. Note that the symbol "S" in FIG. 6 indicates a step. Also, the engine 2 is assumed to be operated in the full load driving mode at the start of the shifting operation.

S1 and S2:

When the operation signal of the up-shift switch 36c is input from the running operation device 36 at time t01, an up-shift signal (speed stage shifting command signal) for causing an up-shift from first speed to third speed is generated in the controller 15 on the basis of the operation signal (the YES determination of S1). Thus, in the target vehicle speed setting section 15e a calculation process is performed using formula (2) to set the target vehicle speed VM (S2) on the basis of the actual vehicle speed V calculated in the vehicle speed calculating section 15, the vehicle forward-to-rear direction slope angle θ calculated in the vehicle forward-to-rear direction slope angle calculating section 15d, and table 1 (or tables 2 and 3). Steps S1 and S2 are explained in further detail in the flowchart shown in FIG. 11(A).

More specifically, when an up-shift signal (speed stage shifting command signal) is generated for an up-shift from first speed to third speed in the controller 15 (the YES determination in S101), the vehicle speed calculating section 15a calculates the actual vehicle speed VJ (equivalent to V1) at the time when the speed stage shifting command signal is generated, on the basis of the T/M output shaft revolution speed signal, which is output from the T/M output shaft revolution speed sensor 28 (S102; refer to (C) of FIG. 7).

Next, the vehicle forward-to-rear direction slope angle calculating section 15d calculates the vehicle forward-to-rear direction slope angle θ (for example minus 7 degrees) on the basis of the vehicle forward-to-rear direction slope angle signal output from the slope angle sensor 37. Then the value k8 of the coefficients that corresponds to this vehicle forward-to-rear direction slope angle θ (−7°; −12°<θ≦−6°) and to the content of the speed stage shifting command signal generated in S101 (up-shift from first speed to third speed), is read from the data table (table 1) of the memory device 15n (S103).

Next, the target vehicle speed setting section 15e performs a calculation process using formula (2) to set the target vehicle speed VM (equivalent to k8/V1), on the basis of the actual vehicle speed VJ (equivalent to V1) calculated in S102 and the coefficient α(=k8) read in S103. (S104).

S3 to S5:

The actual engine revolution speed immediately before time t02 is assumed to be N1 (refer to (A) of FIG. 7). When a speed stage shifting command signal is generated, the engine control device 44, at time t02, reduces the fuel injection amount of the fuel injection device 14 from Q1 to Q2 before time t04, which is the start of the connecting operation of the selected third speed clutch 27, in order to lower the engine revolution speed from the current revolution speed N1 to a revolution speed N2 (refer to (B) of FIG. 7). Here, the engine revolution speed N2 is one in which the input side revolution speed and the output side revolution speed of the selected third speed clutch 27 match (are synchronized) (S3). This control of the engine revolution speed synchronizes the revolution speed of the input shaft 4a of the transmission 4 to the revolution speed of the third-speed speed stage 24 when the connecting operation of the third speed clutch 27 is performed (refer to (A) of FIG. 7).

The pre-shift first speed clutch 25 is in a state of complete connection immediately before time t02, and the clutch pressure P is maintained at the setting pressure P1 (refer to (F) of FIG. 7). When a speed stage shifting command signal is generated, at time t02, the first speed clutch control device 40 lowers the clutch pressure P of the first speed clutch 25 from the setting pressure P1 to a drain standby pressure P2, which is the limit in which sliding does not occur (S4; refer to (F) of FIG. 7).

The lockup clutch 34 is in a state of complete connection immediately before time t02, and the clutch pressure P is maintained at the setting pressure P3. When a speed stage shifting command signal is generated, during the period from time t02 to time t03, the lockup clutch control device 43 lowers the clutch pressure P of the lockup clutch 34 in stages from the setting pressure P3 to a half lockup pressure P4 in which the lockup clutch 34 is in a sliding state (refer to (H) of FIG. 7).

The forward clutch 18 is in a state of complete connection immediately before time t02, and the clutch pressure P is maintained at the setting pressure P5. When a speed stage shifting command signal is generated, at time t02, the forward clutch control device 38 lowers the clutch pressure P of the forward clutch 18 from the setting pressure P5 to a clutch pressure P6 in which the forward clutch 18 enters a sliding state (S5, refer to (E) of FIG. 7).

S6 and S7:

Next, the forward clutch control device 38 controls the clutch pressure P of the forward clutch 18 during the period from time t02 to time t04 so that the actual vehicle speed V calculated by the vehicle speed calculating section 15a, matches the target vehicle speed k8·V1.

Control of the clutch pressure P of the forward clutch 18 is performed for example as follows.

More specifically, a feedback amount is assumed to be the current actual vehicle speed V calculated by the vehicle speed calculating section 15a and a deviation ΔV is calculated for the target vehicle speed k8·V1 and the current actual vehicle speed V. Then a clutch pressure increase/reduction amount ΔP is calculated corresponding to this deviation ΔV. Next, the clutch pressure P of the forward clutch 18 is adjusted so that a clutch pressure P+ΔP can be obtained by adding the clutch pressure increase/reduction amount ΔP to the current clutch pressure P. When the vehicle speed V is greater than or equal to the target vehicle speed k8·V1, the clutch pressure P of the forward clutch 18 is increased, and when the vehicle speed V is less than the target vehicle speed k8·V1, the clutch pressure P of the forward clutch 18 is reduced (refer to (C) of FIG. 7).

By controlling the vehicle speed in this manner to match it to the target vehicle speed, the actual vehicle speed change rate "a" is held within the predetermined range a1 to a2 in at least the instant (time t04) of the start of the connecting operation of the selected third speed clutch 27.

More specifically, the vehicle undergoes an acceleration effect due to the influence of gravity. When the acceleration added to the vehicle is too strong, the clutch pressure P of the forward clutch 18 is raised and the sliding amount of the forward clutch 18 is reduced, thus the acceleration is lessened. In an opposite manner, when the acceleration is too weak, the clutch pressure P of the forward clutch 18 is lowered and the sliding amount of the forward clutch 18 is increased, thus the acceleration is strengthened (refer to (D) of FIG. 7). Thus the actual vehicle speed V reaches the target vehicle speed k8·V1 at the instant (time t04) of the start of the connecting operation of the third speed clutch 27 (refer to (C) of FIG. 7), and the actual vehicle speed change rate "a" is held securely in the range (a1 to a2) of a vehicle speed change rate in which shift shock does not occur before the start (time t04) of the connecting operation of the third speed clutch 27. Note that even in cases in which the actual vehicle speed V does not match the target vehicle speed k8·V1 before the start time t04 of the connecting operation of the third speed clutch 27, a limit time may be set in which after the passing of a predetermined time (t02 to t04) advancement is made to the next process (from S8) (S6 and S7).

In the present embodiment, as shown above, control is performed to match the vehicle speed V to the target vehicle speed k8·V1 during the period before the start (time t04) of the connecting operation of the post-shift selected speed stage clutch 27, and the vehicle speed change rate "a" is held in the predetermined range a1 to a2 at least before the start (time t04) of the connecting operation of the third speed clutch 27, hence when the speed stage clutch 27 is connected a sudden change in vehicle speed does not occur and shift shock (a feeling of being thrown) is not imparted to the operator. In particular, the target vehicle speed k8·V1 is a value set in consideration of the acceleration element due to gravity when the vehicle is descending a slope, thus even when descending a slope a strong shift shock is not imparted to the operator.

Also, in the present embodiment, the engine revolution speed is lowered to the revolution speed N2 and the input side revolution speed and the output side revolution speed of the selected third speed clutch 27 are matched (synchronized) by time t04 in which the connecting operation of the selected third speed clutch 27 is started, hence shift shock is reduced even further.

S8 and S9:

When the actual vehicle speed V calculated by the vehicle speed calculating section 15a reaches the target vehicle speed k8·V1 at time t04 (the YES determination in S7, refer to (C) of FIG. 7), the first speed clutch control device 40 causes the clutch pressure oil of the pre-shift first speed clutch 25 to drain, thereby lowering the clutch pressure P from the drain standby pressure P2 to a clutch pressure P7 in which a state is reached in which power transmission is completely cut off (S8), and the third speed clutch control device 42 gradually increases the clutch pressure P of the post-shift selected third speed clutch 27 from an initial pressure P8 to a setting pressure P9 in which a state of complete connection is reached, thus the third speed clutch 27 is gradually connected (engaged) (S9).

S10:

Next, adjustment control of the clutch pressure of the currently selected forward clutch 18 is performed so that the vehicle speed change rate "a" reaches a predetermined value a3 during the period (times t04 to t05 in (G) of FIG. 7) from the start of the connecting operation of the selected speed stage clutch (third speed clutch) 27 to the completion of the connecting operation (refer to (D) and (E) of FIG. 7).

More specifically, the forward clutch control device 38 adjusts the clutch pressure of the forward clutch 18 so that the actual vehicle speed change rate "a" calculated by the vehicle speed change rate calculating section 15b becomes the predetermined vehicle speed change rate a3, during the period from time t04 of the start of the connecting operation of the third speed clutch 27 to time t05 of the completion of the connecting operation. Here the predetermined vehicle speed change rate a3 is set to a value of a vehicle speed change rate in which the operator does not feel shift shock and a speed suitable for the third-speed speed stage 24 is smoothly reached (without sudden changes in the vehicle speed).

Control of the clutch pressure of this forward clutch 18 is performed specifically as follows.

The vehicle undergoes an acceleration effect due to the influence of gravity. When the degree of acceleration tends towards getting greater, the clutch pressure P of the forward clutch 18 is raised reducing the amount of sliding of the forward clutch 18, thus the degree of acceleration is lessened. In an opposite manner, when the degree of acceleration tends towards getting smaller, the clutch pressure P of the forward clutch 18 is lowered increasing the amount of sliding of the forward clutch 18, thus the degree of acceleration is increased. Thus the actual vehicle speed change rate "a" is matched to the predetermined value a3. Note that an embodiment is also possible in which a limiter is provided to prevent the clutch pressure from dropping below the current clutch pressure in cases in which it is considered that the durability of the clutch will be effected by increasing the sliding of the clutch when the degree of acceleration lessens.

Also, in the present embodiment, in the period from time t02 to time t05, a clutch that is caused to slide by adjusting the clutch pressure is assumed as the running stage clutch (forward clutch), however, an embodiment in which another speed stage clutch is used is possible (S10).

As described above, during the period from time t04 of the start of the connecting operation of the third speed clutch 27 to time t05 of the completion of the connecting operation, the actual vehicle speed change rate "a" is set to the predetermined vehicle speed change rate a3, hence the speed change while the third speed clutch 27 is in a shifting operation is not sudden and shift shock is not imparted to the operator.

Also according to the present embodiment, the clutch pressure P of the lockup clutch 34 is such that a sliding state (half lockup pressure P4) is reached during the shifting operation of the third speed clutch 27, hence shift shock from the third speed clutch 27 is absorbed by the lockup clutch 34 and shift shock is reduced even further.

S11:

Next, control is performed in which the clutch pressure of the currently selected forward clutch 18 is gradually increased after the completion of the connecting operation of the selected speed stage clutch (third speed clutch) 27 (after time t05 in (G) of FIG. 7), while the vehicle speed change rate "a" is maintained to the predetermined value a3 (refer to (D) and (E) of FIG. 7).

More specifically, the forward clutch control device 38 gradually increases the clutch pressure of the forward clutch 18 while substantially maintaining the vehicle speed change rate "a", calculated by the vehicle speed change rate calculating section 15b, equal to the predetermined value a3 during the period from time t05 to time t06. Also in the present embodiment a clutch that is caused to slide by adjusting the clutch pressure, during the period from time t05 to time t06 is assumed as the running stage clutch (forward clutch), however, an embodiment in which another speed stage clutch is used is possible (S11).

As described above, even after the selected speed stage clutch (third speed clutch) 27 is connected, the clutch pressure of the forward clutch 18 is gradually increased while the actual vehicle speed change rate "a" is substantially maintained equal to the predetermined value a3 during the period from time t05 to time t06, hence shift shock occurring when the speed stage clutch (third speed clutch) 27 is connected is suppressed even further.

S12:

Next the lockup clutch control device 43 selects the pressure rise slope φ of the lockup clutch 34 corresponding to the slip rate S calculated by the slip rate calculating section 15c, from the data table stored in the memory device 15n (S12).

S13 and S14:

Next, when the slip rate S calculated in the slip rate calculating section 15c reaches a value less than or equal to a predetermined value (for example, 10%) at time t06 (a YES determination in S13), the forward clutch control device 38 gradually increases the clutch pressure P of the selected forward clutch 18 to the setting pressure P10 in which a complete connection state is reached, causing the forward clutch 18 to completely connect at time t07 (from time t06 to time t07 in (E) of FIG. 7). Also, the lockup clutch control device 43 gradually increases the clutch pressure P of the lockup clutch 34 according to the selected pressure rise slope φ, to the setting pressure P11 in which a state of complete connection is reached, causing the lockup clutch 34 to completely connect (S14; after time t06 in (H) of FIG. 7).

In this manner shift shock can be definitely avoided when completely connecting the forward clutch 18 and the lockup clutch 34.

S15:

When the forward clutch 18 is completely connected at time t07, the engine control device 44 increases the fuel injection amount of the fuel injection device 14, which had dropped to Q2, to Q3. Thus the actual revolution speed of the engine 2 can be set to an engine revolution speed suitable to the running conditions (S15; refer to (B) of FIG. 7).

Note that an explanation of an example was given for steps S1 and S2 of FIG. 6 in which the target vehicle speed VM is set according to the flowchart shown in FIG. 11(A) on the basis of the content of table 1, however, an embodiment is also possible in which the target vehicle speed VM is set according to the flowchart shown in FIG. 11(B) on the basis of the content of table 2.

In this case, first, when an up-shift signal (speed stage shifting command signal) is generated by the controller 15 for causing an up-shift from first speed to third speed (a YES determination in S201), the vehicle speed calculating section 15a calculates the actual vehicle speed VJ (equivalent to V1) at the time of the generation of the speed stage shifting command signal on the basis of the T/M output shaft revolution speed signal output from the T/M output shaft revolution speed sensor 28 (S202; refer to (C) of FIG. 7).

Next, the value k2 of the coefficient, corresponding to the content (up-shift from first speed to third speed) of the speed stage shifting command signal generated in S201, is read from the data table (table 2) in the memory device 15n (S203).

Then the target vehicle speed setting section 15e performs a calculation process using formula (2) to set the target vehicle speed VM (equivalent to k2·V1) on the basis of the actual vehicle speed VJ (equivalent to V1) calculated in S202 and the coefficient α(=k2) read in S203 (S204).

B: A down-shift shifting operation from forward third speed to forward first speed when ascending a slope When a case is assumed in which the down-shift switch 36c is operated at the discretion of the operator while the vehicle is running forward or in reverse, shift shock (a feeling of being thrown) is imparted to the operator when the vehicle speed drastically changes when the post-shift selected speed stage clutch is connected. In particular, when the vehicle is ascending a slope, a greater shift shock is felt by the operator because an acceleration element is added due to gravity.

In the embodiment described below, when the vehicle is ascending a slope, shift shock is not imparted to the operator when for example a down-shift is performed from forward third speed to forward first speed.

FIGS. 8 and 11 are flowcharts explaining the down-shift shifting operation from forward third speed to forward first speed when ascending a slope. FIG. 9 is a time chart explaining the same shifting operation. Note that the symbol "R" in FIG. 6 indicates a step. Also, the engine 2 is assumed to be operated in the full load driving mode at the start of the shifting operation.

R1 and R2:

When the operation signal of the down-shift switch 36d is input from the running operation device 36 at time t11, a down-shift signal (speed stage shifting command signal) for causing down-shift from third speed to first speed is generated in the controller 15 on the basis of the operation signal (a YES determination in R1). Thus, in the target vehicle speed setting section 15e a calculation process is performed using formula (2) to set the target vehicle speed VM (R2) on the basis of the actual vehicle speed V calculated in the vehicle speed calculating section 15, the vehicle forward-to-rear direction slope angle θ calculated in the vehicle forward-to-rear direction slope angle calculating section 15d, and table 1 (or tables 2 and 3). Steps R1 and R2 are explained in further detail in the flowchart shown in FIG. 11(A).

More specifically, when a down-shift signal (speed stage shifting command signal) is generated for a down-shift from third speed to first speed in the controller 15 (the YES determination in S101), the vehicle speed calculating section 15a calculates the actual vehicle speed VJ (equivalent to V5) at the time when the speed stage shifting command signal is generated, on the basis of the T/M output shaft revolution speed signal, which is output from the T/M output shaft revolution speed sensor 28 (S102, refer to (C) of FIG. 9).

Next, the vehicle forward-to-rear direction slope angle calculating section 15d calculates the vehicle forward-to-rear direction slope angle θ (for example 12 degrees) on the basis of the vehicle forward-to-rear direction slope angle signal output from the slope angle sensor 37. Then the value k29 of the coefficients that corresponds to this vehicle forward-to-rear direction slope angle θ (12°; 12°≦θ) and to the content of the speed stage shifting command signal generated in S101 (down-shift from third speed to first speed), is read from the data table (table 1) of the memory device 15n (S103).

Then the target vehicle speed setting section 15e performs a calculation process using formula (2) to set the target vehicle speed VM (equivalent to k29·V5), on the basis of the actual vehicle speed VJ (equivalent to V5) calculated in S102 and the coefficient α(=k29) read in S103. (S104).

R3 to R5:

The third speed clutch 27 is in a state of complete connection immediately before time t12, and the clutch pressure P is maintained at the setting pressure P15 (refer to (G) of FIG. 9). When a speed stage shifting command signal is generated, at time t12, the third speed clutch control device 42 lowers the clutch pressure P of the third speed clutch 27 from the setting pressure P15 to a drain standby pressure P16, which is the limit in which sliding does not occur (R3, refer to (G) of FIG. 9).

The lockup clutch 34 is in a state of complete connection immediately before time t12, and the clutch pressure P is maintained at the setting pressure P17. When a speed stage shifting command signal is generated, during the period from time t12 to time t13, the lockup clutch control device 43 lowers the clutch pressure P of the lockup clutch 34 in stages from the setting pressure P17 to a half lockup pressure P18 in which the lockup clutch 34 is in a sliding state (refer to (H) of FIG. 9).

The forward clutch 18 is in a state of complete connection immediately before time t12, and the clutch pressure P is maintained at the setting pressure P19. When a speed stage shifting command signal is generated, at time t12, the forward clutch control device 38 lowers the clutch pressure P of the forward clutch 18 from the setting pressure P19 to a clutch pressure P20 in which the forward clutch 18 enters a sliding state (R4; refer to (E) of FIG. 9).

The actual engine revolution speed immediately before time t12 is assumed to be N5 (refer to (A) of FIG. 9). When a speed stage shifting command signal is generated, the engine control device 44, at time t02, switches from the full load driving mode to the high output driving load. Thus, as shown by the diagonal lines G in FIG. 5, it is possible for a fuel amount exceeding the upper limit of the fuel injection amount regulated by the maximum torque line TA of the full load driving mode, to be injected from the fuel injection device 14.

The engine control device 44 increases the fuel injection amount of the fuel injection device 14 from Q5 to Q6 before time t14, which is the start of the connecting operation of the selected first speed clutch 25, in order to raise the engine revolution speed from the current revolution speed N5 to a revolution speed N6 (refer to (B) of FIG. 9). Here, the engine revolution speed N6 is one in which the input side revolution speed and the output side revolution speed of the selected first speed clutch 25 match (are synchronized) (R5). This control of the engine revolution speed synchronizes the revolution speed of the input shaft 4a of the transmission 4 to the revolution speed of the first-speed speed stage 22 when the connecting operation of the first speed clutch 25 is performed (refer to (A) of FIG. 9).

R6 and R7:

Next, the forward clutch control device 38 controls the clutch pressure P of the forward clutch 18 during the period from time t12 to time t14 so that the actual vehicle speed V calculated by the vehicle speed calculating section 15a, matches the target vehicle speed k29·V5.

Control of the clutch pressure P of the forward clutch 18 is performed for example as follows.

More specifically, a feedback amount is assumed to be the current actual vehicle speed V calculated by the vehicle speed calculating section 15a and a deviation ΔV is calculated for the target vehicle speed k29·V5 and the current actual vehicle speed V. Then a clutch pressure increase/reduction amount ΔP is calculated corresponding to this deviation ΔV. Next, the clutch pressure P of the forward clutch 18 is adjusted so that a clutch pressure P+ΔP can be obtained by adding the clutch pressure increase/reduction amount ΔP to the current clutch pressure P. When the vehicle speed V is greater than or equal to the target vehicle speed k29·V5, the clutch pressure P of the forward clutch 18 is reduced, and when the vehicle speed V is less than the target vehicle speed k29·V5, the clutch pressure P of the forward clutch 18 is increased (refer to (C) of FIG. 9).

By controlling the vehicle speed in this manner to match it to the target vehicle speed, the actual vehicle speed change rate "a" is held within the predetermined range a5 to a6 in at least the instant (time t14) of the start of the connecting operation of the selected first speed clutch 25.

More specifically, the vehicle undergoes a deceleration effect due to the influence of gravity. When the deceleration added to the vehicle is too strong, the clutch pressure P of the forward clutch 18 is raised and the sliding amount of the forward clutch 18 is reduced, thus the deceleration is lessened. In an opposite manner, when the deceleration is too weak, the clutch pressure P of the forward clutch 18 is lowered and the sliding amount of the forward clutch 18 is increased, thus the deceleration is strengthened (refer to (D) of FIG. 9). Thus the actual vehicle speed V reaches the target vehicle speed k29·V5 at the instant (time t14) of the start of the connecting operation of the first speed clutch 25 (refer to (C) of FIG. 9), and the actual vehicle speed change rate "a" is held securely in the range (a5 to a6) of a vehicle speed change rate in which shift shock does not occur, before the start (time t14) of the connecting operation of the first speed clutch 25. Note that even in cases in which the actual vehicle speed V does not match the target vehicle speed k29·V5 before the start time t14 of the connecting operation of the first speed clutch 25, a limit time may be set in which after the passing of a predetermined time (t12 to t14) advancement is made to the next process (from R8) (R6 and R7).

In the present embodiment, as shown above, control is performed to match the vehicle speed V to the target vehicle speed k29·V5 during the period before the start (time t14) of the connecting operation of the post-shift selected speed stage clutch 25, and the vehicle speed change rate "a" is held in the predetermined range a5 to a6 before at least the start (t14) of the connecting operation of the first speed clutch 25, hence when the speed stage clutch 25 is connected a sudden change in vehicle speed does not occur and shift shock (a feeling of being thrown) is not imparted to the operator. In particular, the target vehicle speed k29·V5 is a value set in consideration of the deceleration element due to gravity when the vehicle is ascending a slope, thus even when ascending a slope a strong shift shock is not imparted to the operator.

Also, in the present embodiment, the engine revolution speed is raised to the revolution speed N6 and the input side revolution speed and the output side revolution speed of the selected first speed clutch 25 are matched (synchronized) by time t14 in which the connecting operation of the selected first speed clutch 25 is started, hence shift shock is reduced even further.

R8 and R9:

When the actual vehicle speed V calculated by the vehicle speed calculating section 15a reaches the target vehicle speed k29·V5 at time t14 (the YES determination in R7, refer to (C) of FIG. 9), the third speed clutch control device 42 causes the clutch pressure oil of the pre-shift third speed clutch 27 to drain, thereby lowering the clutch pressure P from the drain standby pressure P16 to a clutch pressure P21 in which a state is reached in which power transmission is completely cut off (R8), and the first speed clutch control device 40 gradually increases the clutch pressure P of the post-shift selected first speed clutch 25 from an initial pressure P22 to a setting pressure P23 in which a state of complete connection is reached, thus the first speed clutch 25 is gradually connected (engaged) (R9).

R10:

Next, adjustment control of the clutch pressure of the currently selected forward clutch 18 is performed so that the vehicle speed change rate "a" reaches a predetermined value a7 during the period (times t14 to t15 in (F) of FIG. 9) from the start of the connecting operation of the selected speed stage clutch (first speed clutch) 25 to the completion of the connecting operation (refer to (D) and (E) of FIG. 9).

More specifically, the forward clutch control device 38 adjusts the clutch pressure of the forward clutch 18 so that the actual vehicle speed change rate "a" calculated by the vehicle speed change rate calculating section 15b becomes the predetermined vehicle speed change rate a7, during the period from time t14 of the start of the connecting operation of the first speed clutch 25 to time t15 of the completion of the connecting operation. Here the predetermined vehicle speed change rate a7 is set to a value of a vehicle speed change rate in which the operator does not feel shift shock and a speed suitable for the first-speed speed stage 22 is smoothly reached (without sudden changes in the vehicle speed).

Control of the clutch pressure of this forward clutch 18 is performed specifically as follows.

The vehicle undergoes a deceleration effect due to the influence of gravity. When the degree of deceleration tends towards getting greater, the clutch pressure P of the forward clutch 18 is raised reducing the amount of sliding of the forward clutch 18, thus the degree of deceleration is lessened. In an opposite manner, when the degree of deceleration tends towards getting smaller, the clutch pressure P of the forward clutch 18 is lowered increasing the amount of sliding of the forward clutch 18, thus the degree of deceleration is increased. Thus the actual vehicle speed change rate "a" is matched to a predetermined value a7. Note that an embodiment is also possible in which a limiter is provided to prevent the clutch pressure from dropping below the current clutch pressure in cases in which it is considered that the durability of the clutch will be effected by increasing the sliding of the clutch when the degree of deceleration lessens.

Also, in the present embodiment, in the period from time t12 to time t15, a clutch that is caused to slide by adjusting the clutch pressure is assumed as the running stage clutch (forward clutch), however, an embodiment in which another speed stage clutch is used is possible (R10).

As described above, during the period from time t14 of the start of the connecting operation of the first speed clutch 25 to time t15 of the completion of the connecting operation, the actual vehicle speed change rate "a" is set to the predetermined vehicle speed change rate a7, hence the speed change while the first speed clutch 25 is in a shifting operation is not sudden and shift shock is not imparted to the operator.

Also according to the present embodiment, the clutch pressure P of the lockup clutch 34 is such that a sliding state (half lockup pressure P18) is reached during the shifting operation of the first speed clutch 25, hence shift shock from the first speed clutch 25 is absorbed by the lockup clutch 34 and shift shock is reduced even further.

R11:

Next, control is performed in which the clutch pressure of the currently selected forward clutch 18 is gradually increased after the completion of the connecting operation of the selected speed stage clutch (first speed clutch) 25 (after time t15 in (F) of FIG. 9), while the vehicle speed change rate "a" is maintained to the predetermined value a7 (refer to (D) and (E) of FIG. 9).

More specifically, the forward clutch control device 38 gradually increases the clutch pressure of the forward clutch 18 while substantially maintaining the vehicle speed change rate "a", calculated by the vehicle speed change rate calculating section 15b, equal to the predetermined value a7 during the period from time t15 to time t16. Also in the present embodiment a clutch that is caused to slide by adjusting the clutch pressure, during the period from time t15 to time t16 is assumed as the running stage clutch (forward clutch), however, an embodiment in which another speed stage clutch is used is possible (R11). Hence shift shock occurring when the speed stage clutch (first speed clutch) 25 is connected is suppressed.

As described above, even after the selected speed stage clutch (first speed clutch) 25 is connected, the clutch pressure of the forward clutch 18 is gradually increased while the actual vehicle speed change rate "a" is substantially maintained equal to the predetermined value a7 during the period from time t05 to time t06, hence shift shock occurring when the speed stage clutch (first speed clutch) 25 is connected is suppressed even further.

R12:

Next the lockup clutch control device 43 selects the pressure rise slope φ of the lockup clutch 34 corresponding to the slip rate S calculated by the slip rate calculating section 15c, from the data table stored in the memory device 15n (R12).

R13 and R14:

Next, when the slip rate S calculated in the slip rate calculating section 15c reaches a value less than or equal to a predetermined value (for example, 10%) at time t16 (a YES determination in R13), the forward clutch control device 38 gradually increases the clutch pressure P of the selected forward clutch 18 to the setting pressure P24 in which a complete connection state is reached, causing the forward clutch 18 to completely connect at time t17 (from time t16 to time t17 in (E) of FIG. 9). Also, the lockup clutch control device 43 gradually increases the clutch pressure P of the lockup clutch 34 according to the selected pressure rise slope φ to the setting pressure P25 in which a state of complete connection is reached, causing the lockup clutch 34 to completely connect (R14; after time t16 in (H) of FIG. 9).

In this manner shift shock can be definitely avoided when completely connecting the forward clutch 18 and the lockup clutch 34.

R15:

When the forward clutch 18 is completely connected at time t17, the engine control device 44 reduces the fuel injection amount of the fuel injection device 14, which had increased to Q6, to Q7. Thus the actual revolution speed of the engine 2 can be set to an engine revolution speed suitable to the running conditions (R15; refer to (B) of FIG. 9).

Note that an explanation of an example was given for steps R1 and R2 of FIG. 8 in which the target vehicle speed VM is set according to the flowchart shown in FIG. 11(A) on the basis of the content of table 1, however, an embodiment is also possible in which the target vehicle speed VM is set according to the flowchart shown in FIG. 11(B) on the basis of the content of table 2.

In this case, first, when a down-shift signal (speed stage shifting command signal) is generated by the controller 15 for causing a down-shift from third speed to first speed (a YES determination in S201), the vehicle speed calculating section 15a calculates the actual vehicle speed VJ (equivalent to V5) at the time of the generation of the speed stage shifting command signal on the basis of the T/M output shaft revolution speed signal output from the T/M output shaft revolution speed sensor 28 (S202; refer to (C) of FIG. 9).

Next, the value k5 of the coefficients, corresponding the content (down-shift from third speed to first speed) of the speed stage shifting command signal generated in S201, is read from the data table (table 2) in the memory device 15n (S203).

Then the target vehicle speed setting section 15e performs a calculation process using formula (2) to set the target vehicle speed VM (equivalent to k5·V5) on the basis of the actual vehicle speed VJ (equivalent to V5) calculated in S202 and the coefficient α(=k5) read in S203 (S204).

In the embodiment described above shift control was explained in the case of an up-shift from first speed to third speed and in the case of a down-shift from third speed to first speed, however, this is just one example, and up-shift and down-shift shift control among other speed stages (up-shift from first speed to second speed, up-shift from second speed to third speed, down-shift from third speed to second speed, down-shift from second speed to first speed) can be performed in the same manner.

Also in the embodiment described above, which is a case in which it is assumed that the vehicle is in forward running, explanation was given of a case in which the clutch pressure of the currently selected forward clutch 18 is controlled ((E) of FIG. 7 and (E) of FIG. 9), however, in a case in which the vehicle is in reverse running, control of the reverse clutch 20, which is the selected speed stage clutch, may be performed in the same manner as the control of the forward clutch 18 shown in (E) of FIG. 7 and (E) of FIG. 9.

Further, in the embodiment described above, an explanation was given assuming that the operator operates the up-shift switch 36b or the down-shift switch 36c, thus generating a speed stage shifting command signal (up-shift command signal, down-shift command signal), and in response to this generated speed stage shifting command signal, shift control is performed as shown in FIG. 6 or FIG. 8, however, automatic shifting is performed in the same manner. More specifically, even if the operator does not operate the up-shift switch 36b or the down-shift switch 36c, a speed stage shifting command signal is generated in the controller 15 in accordance with the load and the like on the vehicle body, following the predetermined shift map. Shift control is performed in the manner as shown in FIG. 6 or FIG. 8 in accordance with this generated speed stage shifting command signal.

INDUSTRIAL APPLICABILITY

The present invention can be used favorably in vehicle shifting control devices, in particular, in construction vehicles, industrial vehicles, farm machinery and the like.

BRIEF DESCRIPTION OF THE DRAWINGS

FIG. 2(A) is a hydraulic circuit drawing of an ECMV and FIGS. 2(B) and 2(C) are drawings explaining the operation of the ECMV;

FIGS. 11 (A) and 11 (B) are flowcharts explaining in detail the contents of processing a portion of the steps in the flowcharts of FIGS. 6 and 8.

Figure 1:
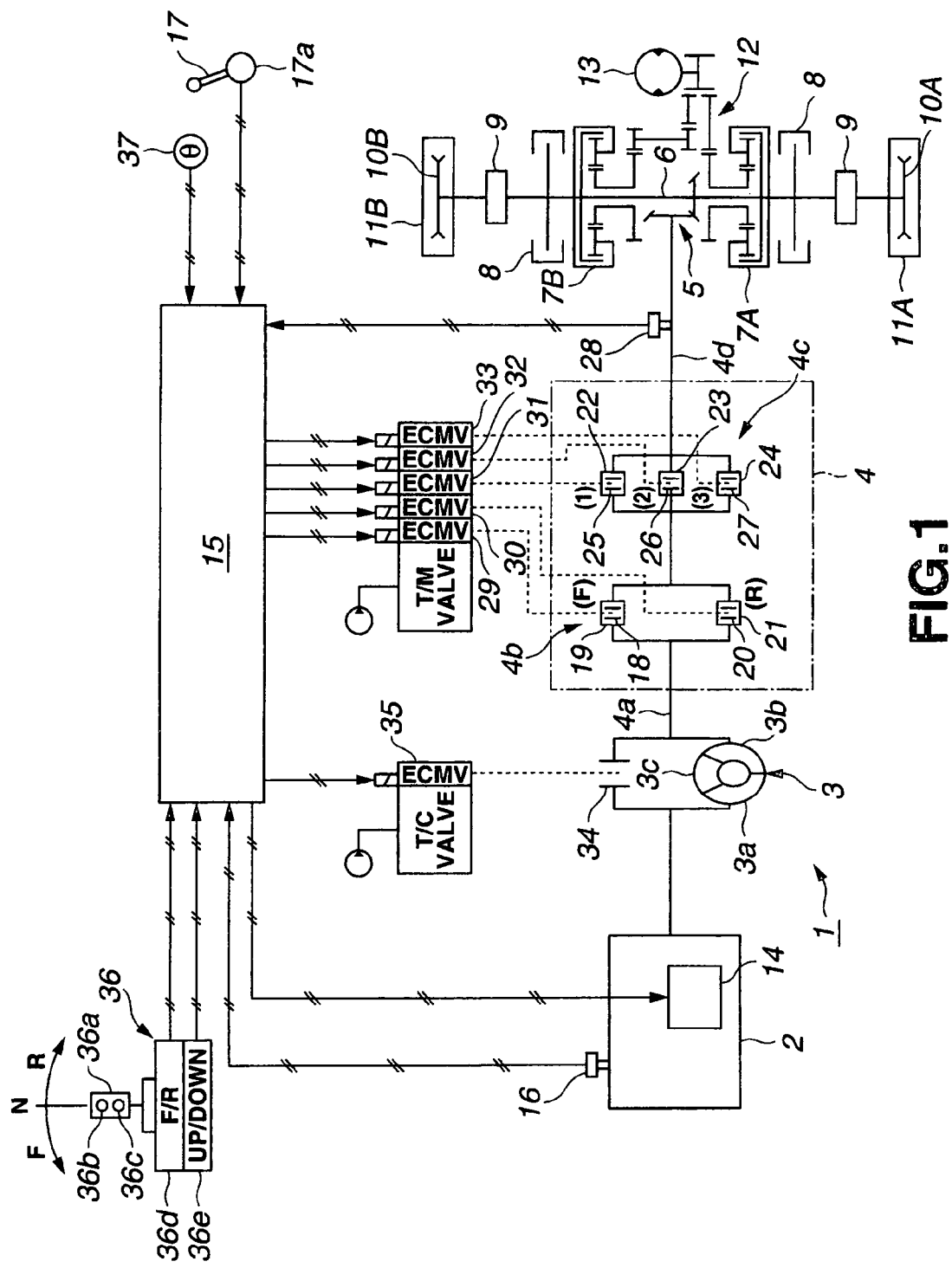
FIG. 1 is a schematic system structure drawing of the vehicle shift device relating to one embodiment of the present invention.
Figure 3:
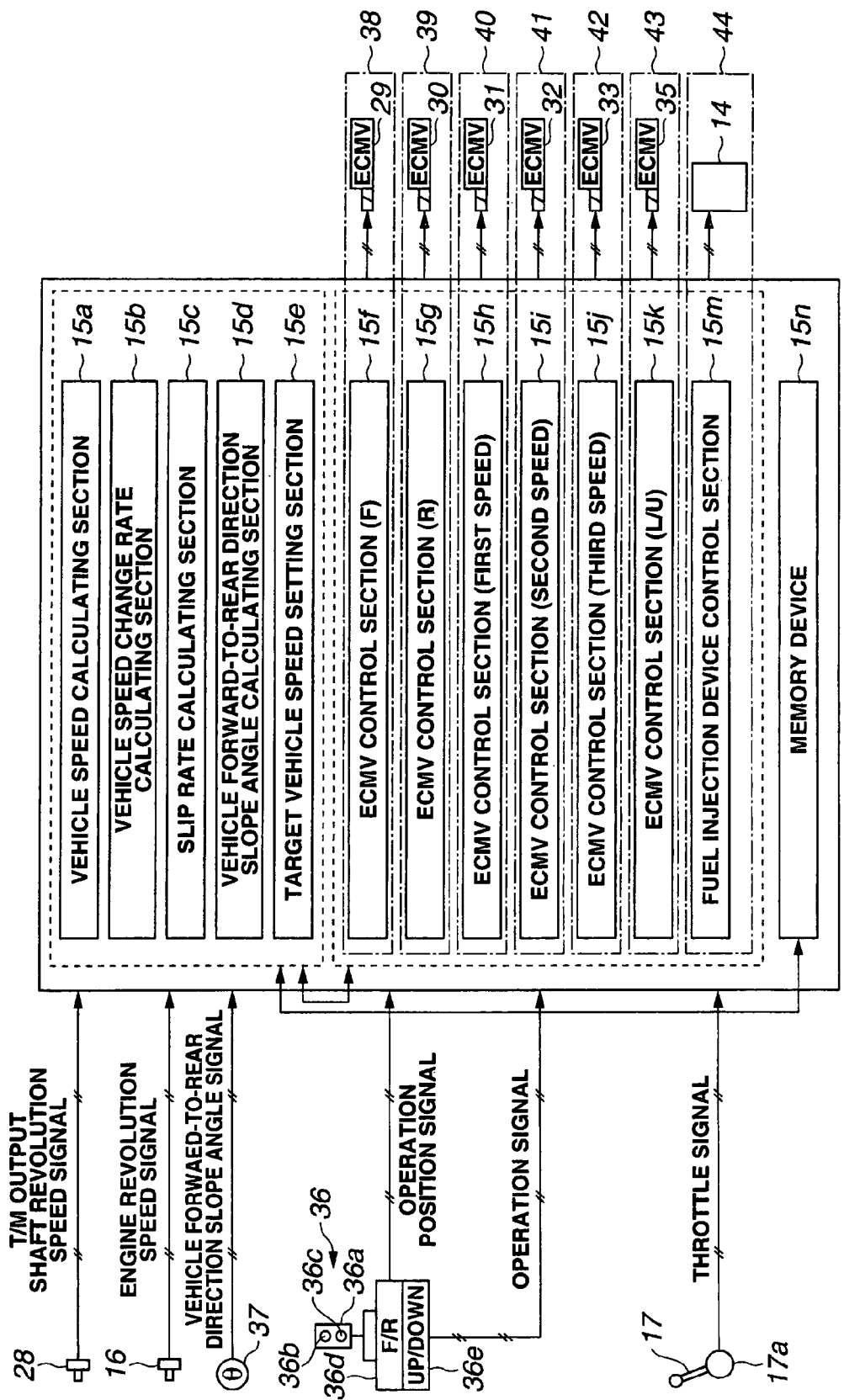
FIG. 3 is a functional block drawing of the controller.
Figure 4:
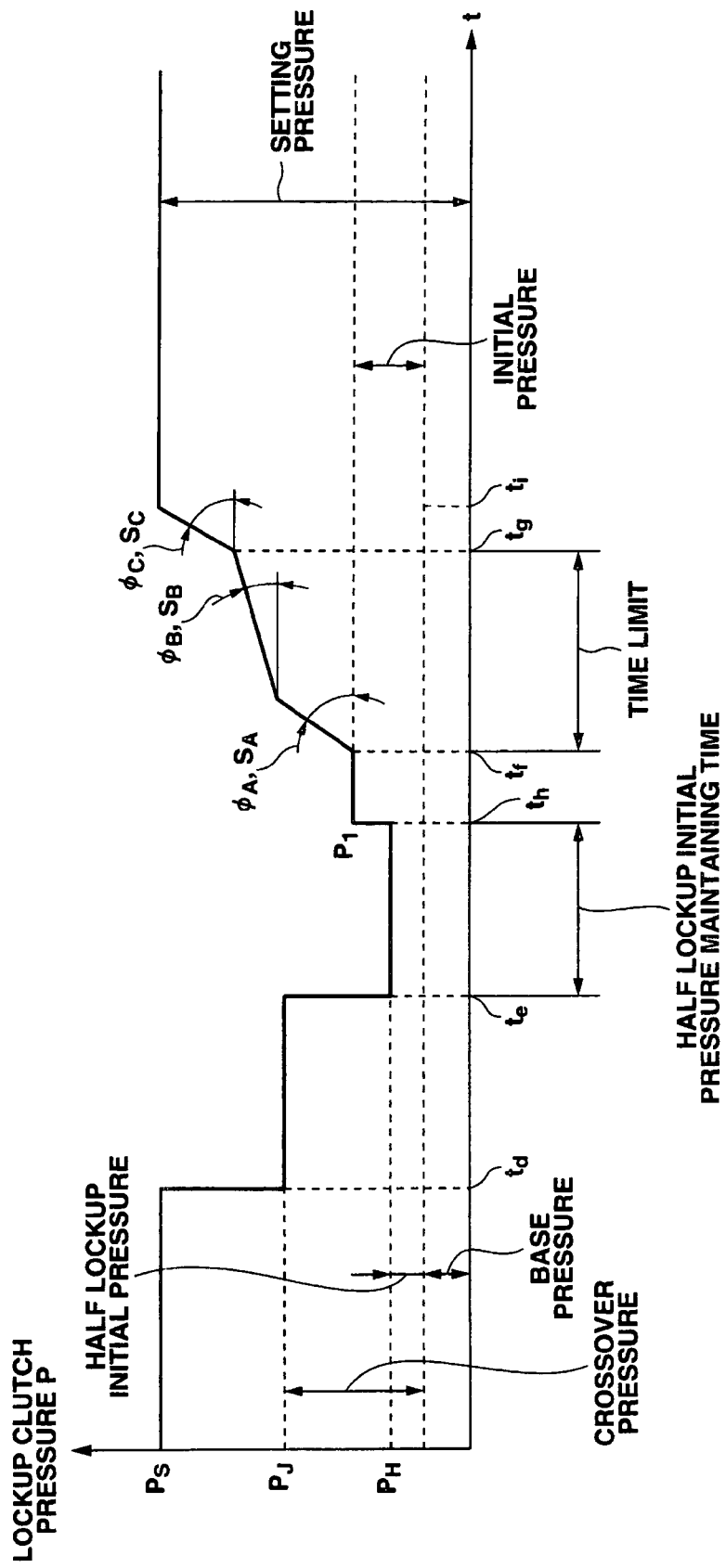
FIG. 4 is a pressure waveform drawing of the lockup clutch.
Figure 5:
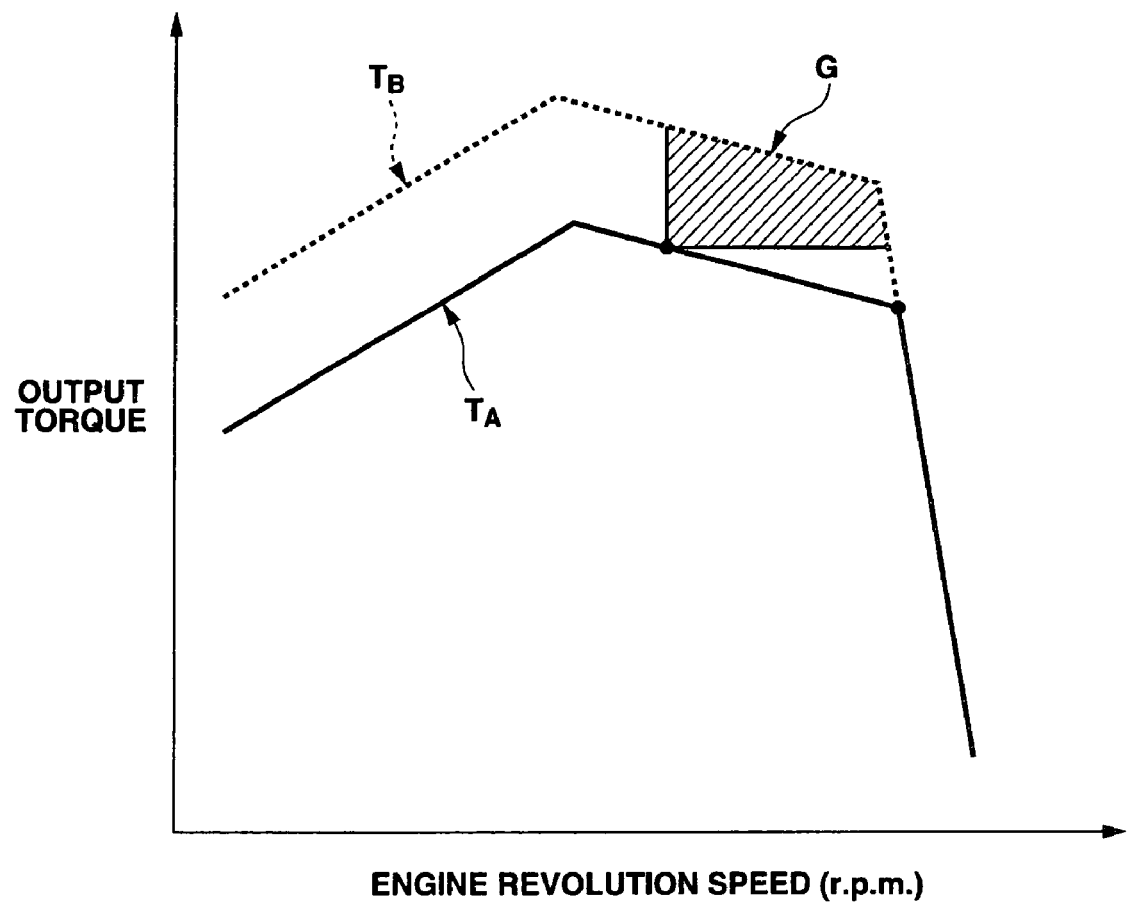
FIG. 5 is a characteristic drawing of the engine output torque.
Figure 6:
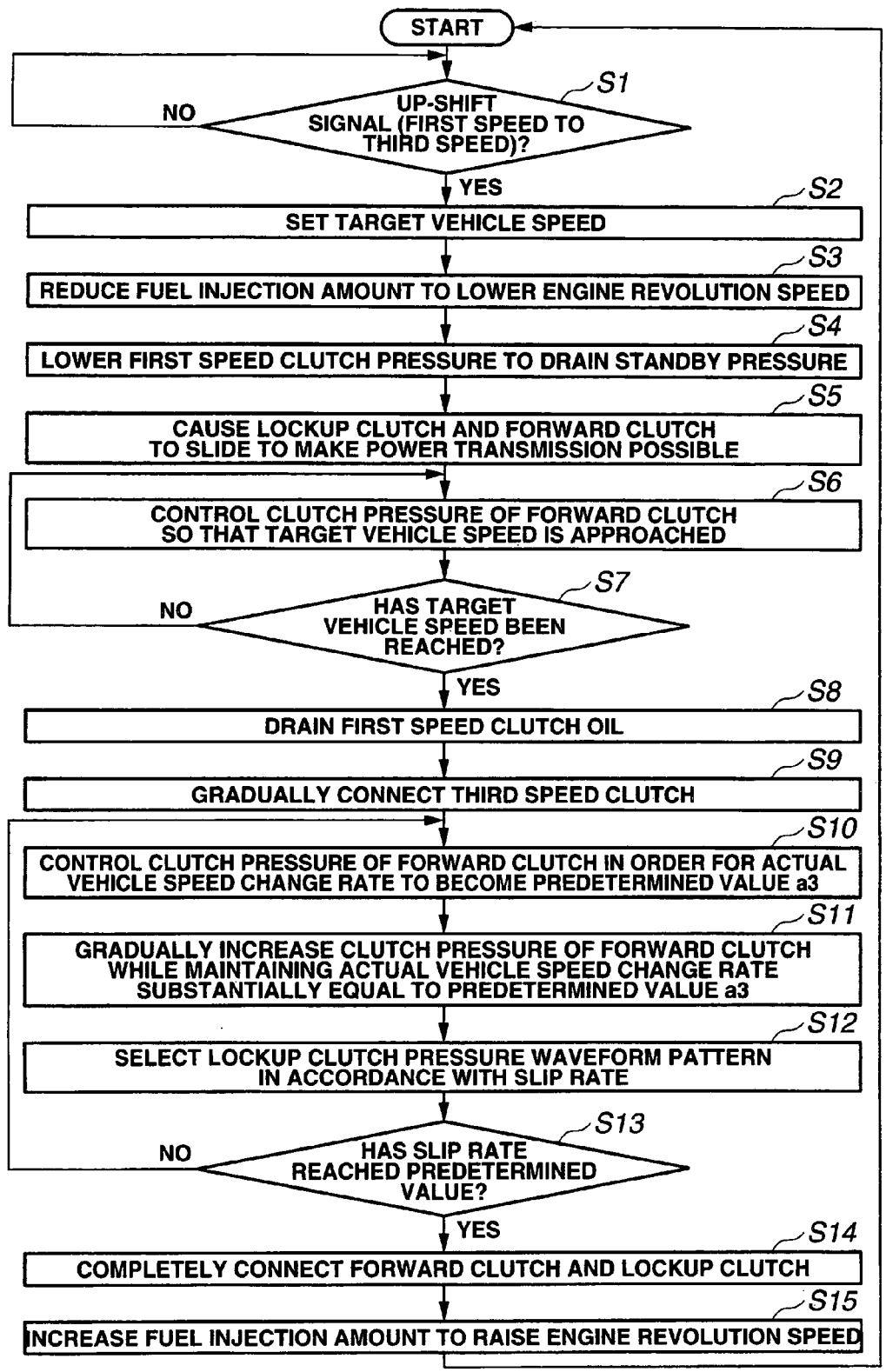
FIG. 6 is a flowchart explaining the up-shift shifting operation from first speed to third speed when descending a slope.
Figure 7:
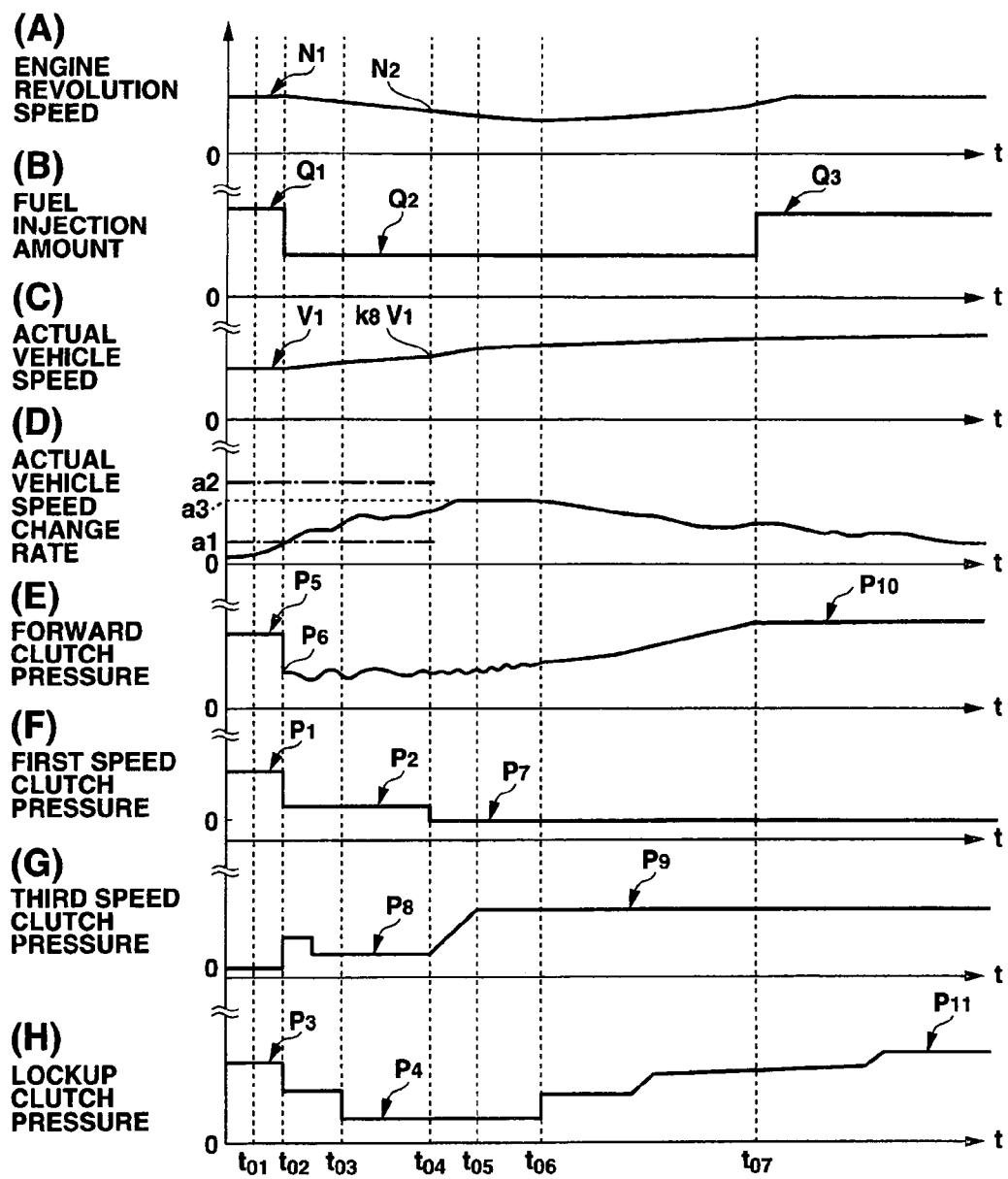
FIG. 7 is a time chart explaining the up-shift shifting operation from first speed to third speed when descending a slope.
Figure 8:
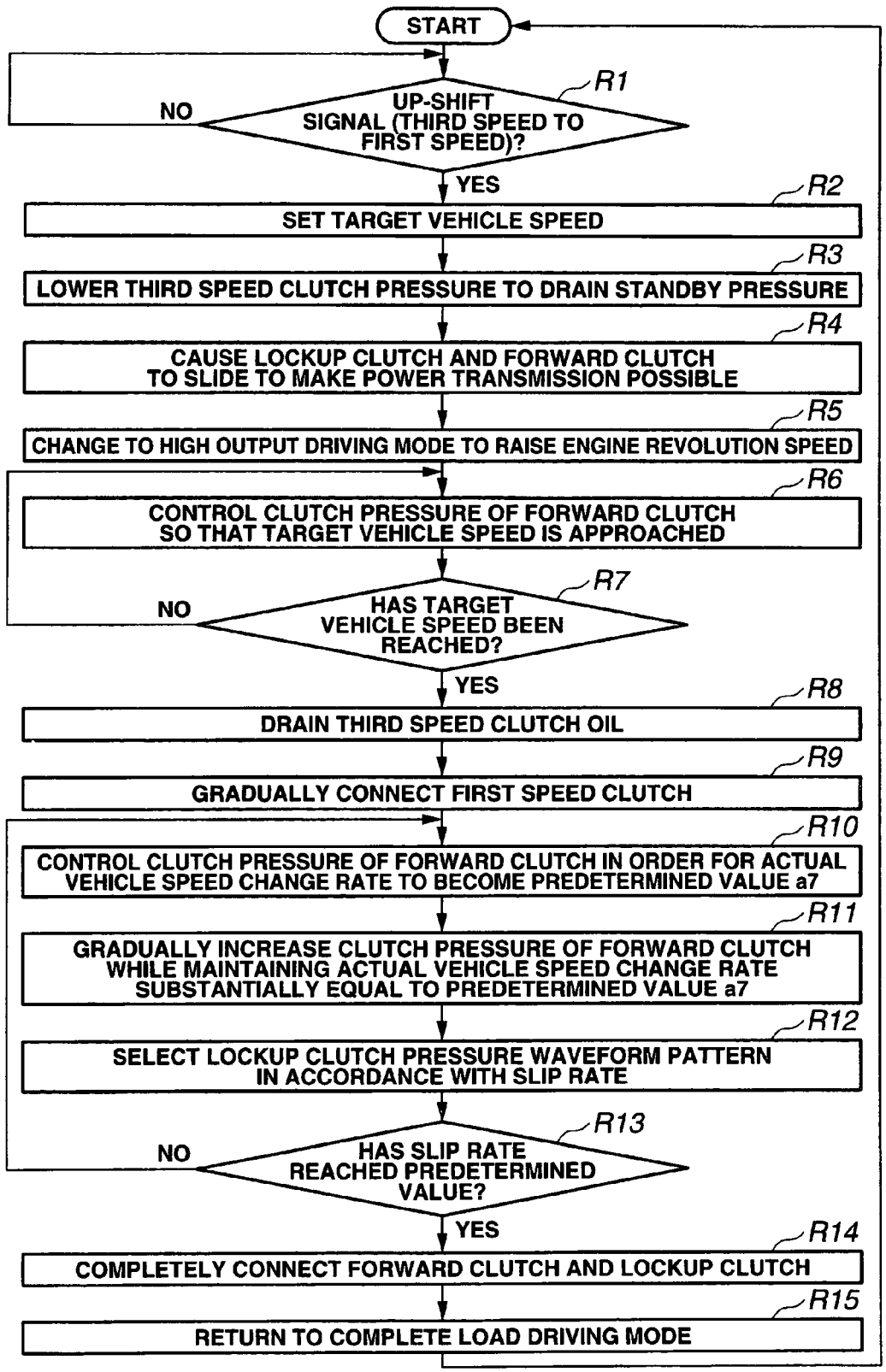
FIG. 8 is a flowchart explaining the down-shift shifting operation from third speed to first speed when ascending a slope.
Figure 9:
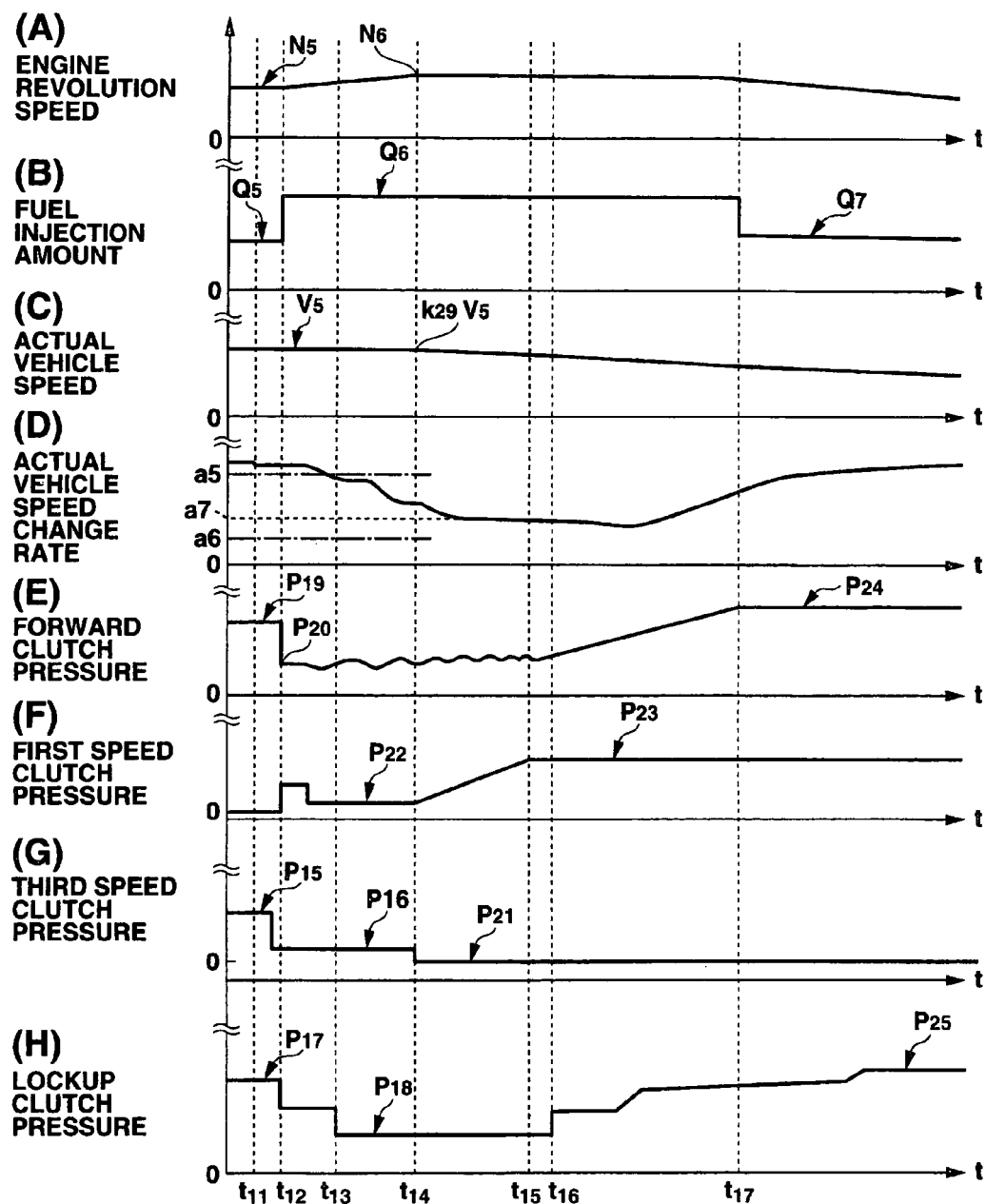
FIG. 9 is a time chart explaining the down-shift shifting operation from third speed to first speed when ascending a slope.
Figure 10:
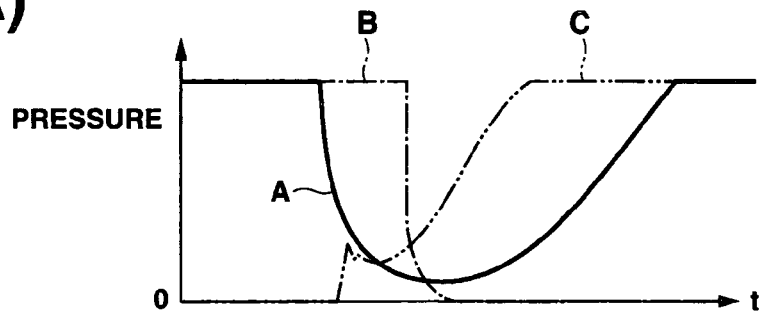
FIG. 10 is a drawing explaining prior art.
Figure 10:
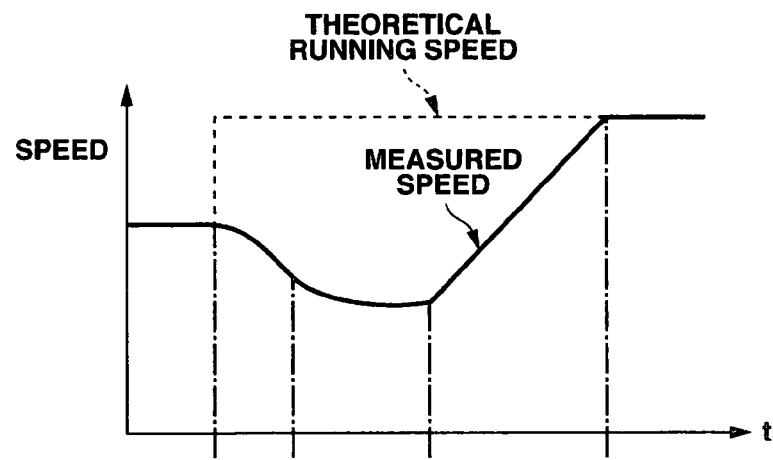
Figure 10:
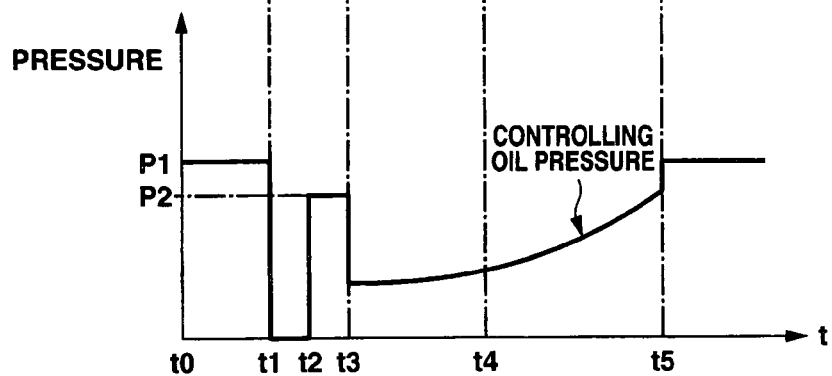

The invention claimed is:

1. A shift control device for a vehicle in which a forward clutch corresponding to a forward running stage, a reverse clutch corresponding to a reverse running stage and speed stage clutches each corresponding to a respective speed stage are provided in an engine power transmission route, one of the speed stage clutches is selected according to a speed stage shifting command, and a power of an engine is transmitted to driving wheels via the selected forward clutch or reverse clutch, and the selected speed stage clutch, characterized by comprising:

vehicle speed detecting means for detecting an actual vehicle speed;

target vehicle speed setting means for setting a target vehicle speed the vehicle should reach when a connecting operation of the selected speed stage clutch is started; and control means for adjusting a friction engagement of another clutch so that the detected vehicle speed matches the target vehicle speed in a period from when the speed stage shifting command is generated until when the start of the connecting operation of the selected speed stage clutch.

2. The shift control device for a vehicle according to claim 1, characterized in that slope angle detection means is provided for detecting a slope angle in a forward-to-rear direction of the vehicle, and in the target vehicle speed setting means the target vehicle speed is set to a value in accordance with the detected vehicle forward-to rear direction slope angle.

3. The shift control device for a vehicle according to claim 1, characterized in that descending slope/ascending slope detection means is provided for detecting whether the vehicle is descending a slope or ascending a slope, and in the target vehicle speed setting means the target vehicle speed is set to a value that varies according to whether the vehicle is descending a slope or ascending a slope.

4. The shift control device for a vehicle according to claim 1, characterized in that in the target vehicle speed setting means the target vehicle speed is set to a value that varies according to whether the content of the speed stage shifting command is an up-shift or a down-shift.

5. The shift control device for a vehicle according to claim 1, characterized in that in the target vehicle speed setting means the target vehicle speed is set in accordance with the content of the speed stage shifting command.

6. The shift control device for a vehicle according to claim 1, characterized in that when the vehicle is descending a slope and the content of the speed stage shifting command is an up-shift, the control means adjusts the friction engagement of the other clutch so that the friction engagement of the other clutch is increased in the case in which the detected vehicle speed is greater than or equal to the target vehicle speed, or so that the friction engagement of the other clutch is reduced in the case in which the detected vehicle speed is lower than the target vehicle speed.

7. The shift control device for a vehicle according to claim 1, characterized in that when the vehicle is ascending a slope and the content of the speed stage shifting command is a down-shift, the control means adjusts the friction engagement of the other clutch so that the friction engagement of the other clutch is reduced in the case in which the detected vehicle speed is greater than or equal to the target vehicle speed, or so that the friction engagement of the other clutch is increased in the case in which the detected vehicle speed is lower than the target vehicle speed.

8. The shift control device for a vehicle according to claim 1, characterized in that the other clutch in which adjustment of the friction engagement is performed, is a latch or the reverse clutch, slip rate calculating means is provided for calculating a slip rate of the engine power transmission route, and the forward or reverse clutch is completely connected by gradually increasing the friction engagement of the selected forward clutch or reverse clutch when the slip rate reaches a predetermined value or less.

9. The shift control device for a vehicle according to claim 1, characterized in that the other clutch in which adjustment of the friction engagement is performed, is the selected forward clutch or reverse clutch, a torque converter, and a lockup clutch, which lockups the torque converter, are provided in the engine power transmission route, slip rate calculating means is provided for calculating a slip rate of the engine power transmission route, a friction engagement of the lockup clutch is lowered to a predetermined level in which the lockup clutch enters a sliding state when the speed stage shifting command is generated, and the forward or reverse clutch is completely connected by gradually increasing the friction engagement of the selected forward clutch or reverse clutch, and the lockup clutch is completely connected by gradually increasing the friction engagement of the lockup clutch, when the slip rate reaches a predetermined value or less.

10. The shift control device for a vehicle according to claim 9, characterized in that the lockup clutch is completely connected by gradually increasing the friction engagement of the lockup clutch in accordance with the trend of the slip rate.

11. The shift control device for a vehicle according to claim 1, characterized in that when the content of the speed stage shifting command is an up-shift and the speed stage shifting command is generated, control is performed to match an output side revolution speed to an input side revolution speed of the selected speed stage clutch by lowering an engine revolution speed by the time of start of the connecting operation of the selected speed stage clutch.

12. The shift control device for a vehicle according to claim 1 characterized in that, when the content of the speed stage shifting command is a down-shift and the speed stage shifting command is generated, control is performed to match an output side revolution speed to an input side revolution speed of the selected speed stage clutch by raising an engine revolution speed by the time of start of the connecting operation of the selected speed stage clutch.

13. The shift control device for a vehicle according to claim 1, characterized in that a torque converter, and a lockup clutch, which lockups the torque converter, are provided in the engine power transmission route, and the friction engagement of the lockup clutch is lowered to a predetermined level in which the lockup clutch enters a sliding state, when the speed stage shifting command is generated and this sliding state is maintained at least throughout the connecting operation of the selected speed stage clutch.

14. A shift control device for a vehicle in which a forward clutch corresponding to a forward running stage, a reverse clutch corresponding to a reverse running stage and speed stage clutches each corresponding to a respective speed stage are provided in an engine power transmission route, one of the speed stage clutches is selected according to a speed stage shifting command, and the power of the engine is transmitted to driving wheels via the selected forward clutch or reverse clutch, and the selected speed stage clutch, characterized by comprising:

vehicle speed change rate detecting/calculating means for detecting or calculating a speed change rate of the vehicle; and control means for adjusting a friction engagement of another clutch so that the detected or calculated vehicle speed change rate reaches a predetermined value in a period from when the connecting operation of the selected speed stage clutch is started until when the connecting operation is completed.

15. The shift control device for a vehicle according to claim 14, characterized in that the other clutch in which adjustment of the friction engagement is performed, is the selected forward clutch or reverse clutch, slip rate calculating means is provided for calculating a slip rate of the engine power transmission route, and the forward or reverse clutch is completely connected by gradually increasing the friction engagement of the selected forward clutch or reverse clutch when the slip rate reaches a predetermined value or less.

16. The shift control device for a vehicle according to claim 15, characterized in that the friction engagement of the selected forward clutch or reverse clutch is gradually increased while maintaining the detected or calculated vehicle speed change rate at a predetermined value, after the completion of the connecting operation of the selected speed stage clutch, and the forward or reverse clutch is completely connected by gradually increasing even further the friction engagement of the selected forward clutch or reverse clutch when the slip rate reaches the predetermined value or less.

17. The shift control device for a vehicle according to claim 14, characterized in that the other clutch in which adjustment of the friction engagement is performed, is the selected forward clutch or reverse clutch, a torque converter, and a lockup clutch, which lockups the torque converter, are provided in the engine power transmission route, slip rate calculating means is provided for calculating a slip rate of the engine power transmission route, a friction engagement of the lockup clutch is lowered to a predetermined level in which the lockup clutch enters a sliding state when the speed stage shifting command is generated, and the forward or reverse clutch is completely connected by gradually increasing the friction engagement of the selected forward clutch or reverse clutch, and the lockup clutch is completely connected by gradually increasing the friction engagement of the lockup clutch, when the slip rate reaches a predetermined value or less.

18. The shift control device for a vehicle according to claim 17, characterized in that the lockup clutch is completely connected by gradually increasing the friction engagement of the lockup clutch in accordance with the trend of the slip rate.

19. The shift control device for a vehicle according to claim 14, characterized in that when the content of the speed stage shifting command is an up-shift and the speed stage shifting command is generated, control is performed to match an output side revolution speed to an input side revolution speed of the selected speed stage clutch by lowering an engine revolution speed by the time of the start of the connecting operation of the selected speed stage clutch.

20. The shift control device for a vehicle according to claim 14, characterized in that when the content of the speed stage shifting command is a down-shift and the speed stage shifting command is generated, control is performed to match an output side revolution speed to an input side revolution speed of the selected speed stage clutch by raising an engine revolution speed by the time of start of the connecting operation of the selected speed stage clutch.

21. The shift control device for a vehicle according to claim 14, characterized in that
a torque converter, and a lockup clutch, which lockups the torque converter, are provided in the engine power transmission route, and
the friction engagement of the lockup clutch is lowered to a predetermined level in which the lockup clutch enters a sliding state, when the speed stage shifting command is generated and this sliding state is maintained at least throughout the connecting operation of the selected speed stage clutch.

22. A shift control device for a vehicle in which a forward clutch corresponding to a forward running stage, a reverse clutch corresponding to a reverse running stage and speed stage clutches each corresponding to a respective speed stage are provided in an engine drive power transmission route, one of the speed stage clutches is selected according to a speed stage shifting command, and the power of the engine is transmitted to driving wheels via the selected forward clutch or reverse clutch, and the selected speed stage clutch, characterized by comprising:
vehicle speed detecting means for detecting an actual vehicle speed;
target vehicle speed setting means for setting a target vehicle speed the vehicle should reach when a connecting operation of the selected speed stage clutch is started;
vehicle speed change rate detecting/calculating means for detecting or calculating a speed change rate for the vehicle; and
control means for adjusting a friction engagement of another clutch so that the detected vehicle speed matches the target vehicle speed in a period from when the speed stage shifting command is generated until when the connecting operation of the selected speed stage clutch is started, and
for adjusting the friction engagement of the other clutch so that the detected or calculated vehicle speed change rate reaches a predetermined value in the period from when the connecting operation of the selected speed stage clutch is started until when the connecting operation is completed.

23. A shift control method for a vehicle in which a forward clutch corresponding to a forward running stage, a reverse clutch corresponding to a reverse running stage and speed stage clutches each corresponding to a respective speed stage are provided in an engine power transmission route, one of the speed stage clutches is selected according to a speed stage shifting command, and the power of the engine is transmitted to driving wheels via the selected forward clutch or reverse clutch, and the selected speed stage clutch, characterized by:
setting a target vehicle speed the vehicle should reach when a connecting operation of the selected speed stage clutch is started; and
performing control to adjust a friction engagement of another clutch so that a detected vehicle speed matches the target vehicle speed in a period from when the speed stage shifting command is generated until when the connecting operation of the selected speed stage clutch is started.

24. A shift control method for a vehicle in which a forward clutch corresponding to a forward running stage, a reverse clutch corresponding to a reverse running stage and speed stage clutches each corresponding to a respective speed stage are provided in an engine power transmission route, one of the speed stage clutches is selected according to a speed stage shifting command, and the power of the engine is transmitted to driving wheels via the selected forward clutch or reverse clutch, and the selected speed stage clutch, characterized by:
performing control to adjust a friction engagement of another clutch so that a detected or calculated vehicle speed change rate reaches a predetermined value in a period from when a connecting operation of the selected speed stage clutch is started until when the connecting operation is completed.

25. A shift control method for a vehicle in which a forward clutch corresponding to a forward running stage, a reverse clutch corresponding to a reverse running stage and speed stage clutches each corresponding to a respective speed stage are provided in an engine power transmission route, one of the speed stage clutches is selected according to a speed stage shifting command, and the power of the engine is transmitted to driving wheels via the selected forward clutch or reverse clutch, and the selected speed stage clutch, characterized by:
setting a target vehicle speed the vehicle should reach when a connecting operation of the selected speed stage clutch is started; and
performing control to adjust a friction engagement of another clutch so that a detected vehicle speed matches the target vehicle speed in a period from when the speed stage shifting command is generated until when the connecting operation of the selected speed stage clutch is started, and to adjust the friction engagement of the other clutch so that a detected or calculated vehicle speed change rate matches a predetermined value in a period from when a connecting operation of the selected speed stage clutch is started until when the connecting operation is completed.

* * * * *